(12) United States Patent
Blad et al.

(10) Patent No.: US 10,677,249 B2
(45) Date of Patent: Jun. 9, 2020

(54) HYDRAULIC SYSTEM

(71) Applicant: Grundfos Holding A/S, Bjerringbro (DK)

(72) Inventors: Thomas Blad, Bjerringbro (DK); Christian Blad, Aalborg (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 322 days.

(21) Appl. No.: 15/538,470

(22) PCT Filed: Dec. 16, 2015

(86) PCT No.: PCT/EP2015/080011
§ 371 (c)(1),
(2) Date: Jun. 21, 2017

(87) PCT Pub. No.: WO2016/102269
PCT Pub. Date: Jun. 30, 2016

(65) Prior Publication Data
US 2017/0356449 A1 Dec. 14, 2017

(30) Foreign Application Priority Data

Dec. 22, 2014 (EP) .................................... 14199691

(51) Int. Cl.
*F04D 13/06* (2006.01)
*F04D 15/00* (2006.01)
(Continued)

(52) U.S. Cl.
CPC ....... *F04D 13/062* (2013.01); *F04D 13/0606* (2013.01); *F04D 15/0005* (2013.01);
(Continued)

(58) Field of Classification Search
CPC .... F24D 3/08; F24D 19/1012; F04D 15/0016; F04D 15/0066
See application file for complete search history.

(56) References Cited

U.S. PATENT DOCUMENTS

| 3,582,229 A * | 6/1971 | von Fellenberg ... F04D 15/0016 415/47 |
| 3,897,903 A | 8/1975 | Race |
| 9,612,036 B2 * | 4/2017 | Hannibalsen ............. F24D 3/08 |

FOREIGN PATENT DOCUMENTS

| DE | 19 42 647 A1 | 3/1970 |
| DE | 23 63 231 A1 | 7/1974 |

(Continued)

*Primary Examiner* — Patrick Hamo
(74) *Attorney, Agent, or Firm* — McGlew and Tuttle, P.C.

(57) ABSTRACT

A hydraulic system includes a circulation pump assembly (2) provided with a speed controller (4, 26), a hydraulic circuit (A, B) connected to the circulation pump assembly (2) as well as a mechanical switch device (86, 88; 120, 122; 120", 122") which is subjected to pressure from a fluid in the hydraulic circuit (A, B) and which can be moved into at least two different switch positions. The mechanical switch device (28; 86, 28; 120, 122) can be moved by the circulation pump assembly (2) by way of a hydraulic coupling via the fluid. The speed controller is configured to initiate a movement of the switch device (86, 88; 120, 122; 120", 122") by way of at least one hydraulic force acting thereon and causing a movement of the switch device (86, 88; 120, 122; 120", 122"), produced via the hydraulic circuit, via a speed adaptation of the circulation pump assembly.

30 Claims, 22 Drawing Sheets

(51) Int. Cl.

| | |
|---|---|
| *F24D 3/08* | (2006.01) |
| *F24D 3/10* | (2006.01) |
| *F24D 19/10* | (2006.01) |
| *F04D 29/42* | (2006.01) |
| *F16K 11/07* | (2006.01) |
| *F16K 31/143* | (2006.01) |

(52) U.S. Cl.
CPC ..... *F04D 15/0022* (2013.01); *F04D 15/0066* (2013.01); *F04D 29/4293* (2013.01); *F16K 11/0708* (2013.01); *F16K 31/143* (2013.01); *F24D 3/08* (2013.01); *F24D 3/105* (2013.01); *F24D 19/1012* (2013.01); *Y02B 30/745* (2013.01)

(56) References Cited

FOREIGN PATENT DOCUMENTS

| | | |
|---|---|---|
| EP | 0 529 353 A1 | 3/1993 |
| EP | 0 569 713 a1 | 11/1993 |
| EP | 0 902 240 A2 | 3/1999 |
| EP | 2 708 825 A1 | 3/2014 |
| EP | 2 775 218 A2 | 9/2014 |
| FR | 2 655 599 A1 | 6/1991 |
| GB | 2 318 179 A | 4/1998 |

* cited by examiner

Fig.21
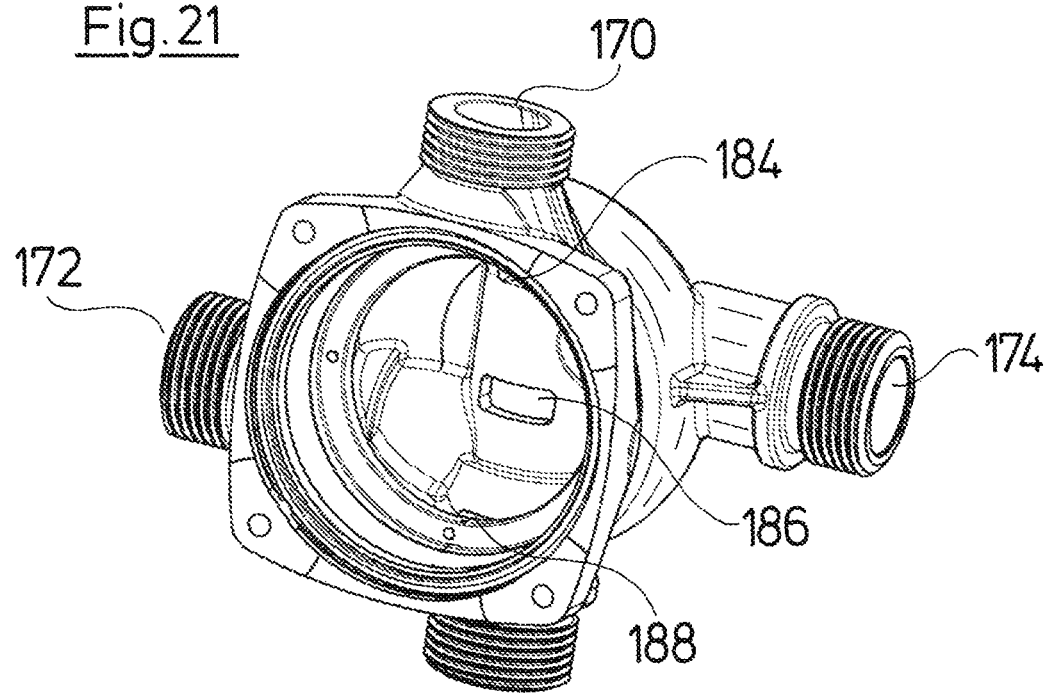

Fig. 22
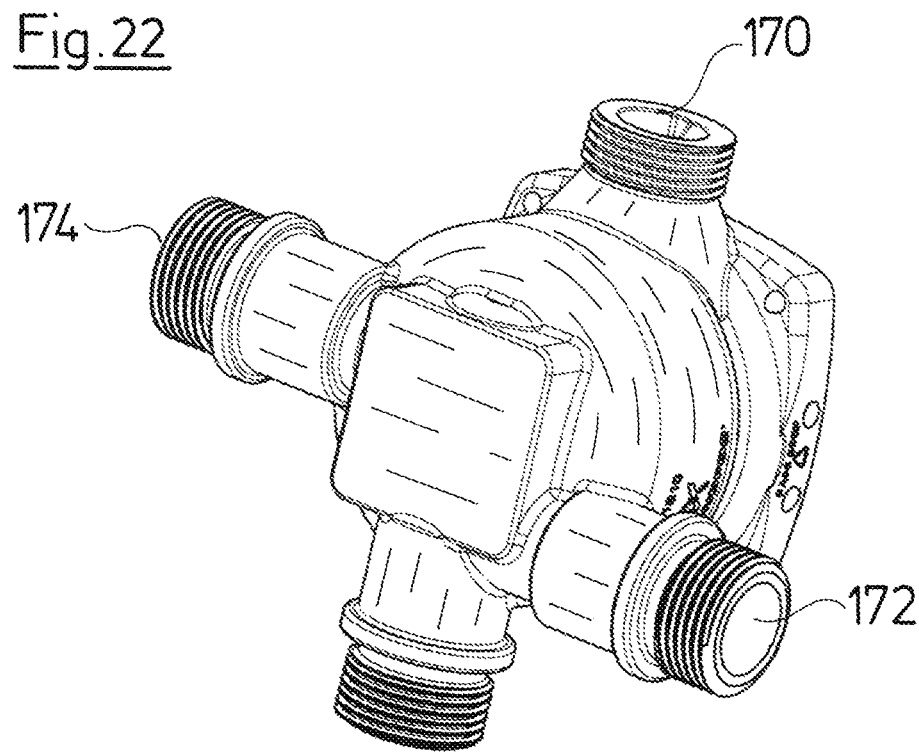
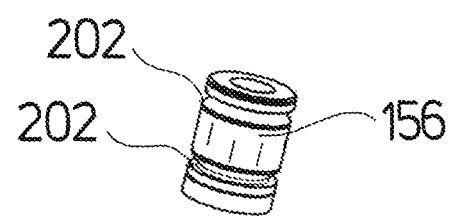
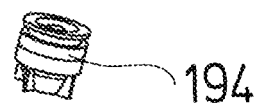

HYDRAULIC SYSTEM

CROSS REFERENCE TO RELATED APPLICATIONS

This application is a United States National Phase Application of International Application PCT/EP2015/080011, filed Dec. 16, 2015, and claims the benefit of priority under 35 U.S.C. § 119 of European Application 14199691.8, filed Dec. 22, 2014, the entire contents of which are incorporated herein by reference.

FIELD OF THE INVENTION

The invention relates to a hydraulic system.

BACKGROUND OF THE INVENTION

Hydraulic systems, in particular hydraulic circulation systems are known for example in the form of heating installations and/or air-conditioning installations, in which a fluid heat transfer medium, for example water, is delivered in a circuit. The hydraulic systems for this, as a rule comprise at least one circulation pump assembly which circulates the fluid in the system.

It is also known, to be able to arrange switch devices such as valves for example, in such hydraulic systems. Switch-over valves which permit the switch-over between two hydraulic circuits or two heating circuits are often to be found in heating installations for example. Thus for example, in a heating installation, a heated heat transfer medium can either be delivered through a room heating circuit or a heat exchanger for heating service water, depending on the switch position of such a valve. The switch-over valves which are necessary for this as a rule are electrically driven and activated. This means that electrical drives with necessary electrical connections are required.

SUMMARY OF THE INVENTION

It is an object of the present invention, to simplify a hydraulic system in a manner such that the number of necessary electrically actuated switch devices in the system can be reduced.

The hydraulic system according to the invention comprises at least one circulation pump assembly and at least one hydraulic circuit connected to this circulation pump assembly. Thereby, the hydraulic circuit is connected to the circulation pump assembly such that the circulation pump assembly circulates a fluid, such as water for example, in the hydraulic circuit. The hydraulic circuit thereby for example can be a heating installation or cooling installation, in which a fluid heat transfer medium, for example water, is delivered in the circuit. With regard to the circulation pump assembly, it is preferably the case of an electromotorically driven circulation pump assembly, e.g. a centrifugal pump assembly, in particular with a wet-running electric drive motor.

The circulation pump assembly according to the invention comprises a speed controller which permits the circulation pump assembly to be operated with at least two different speeds. Preferably, the circulation pump assembly can be set in its speed over a large range via the speed controller, i.e. the speed can be changed over a larger speed range in several steps or in an infinite manner.

Apart from the circulation pump assembly, according to the invention, at least one mechanical switch device is arranged in the hydraulic circuit and this switch device is subjected to the pressure of the fluid located in the hydraulic circuit or of the liquid located in the hydraulic circuit. The mechanical switch device can be moved into at least two different switch positions, i.e. at least into a first and into a second switch position.

According to the invention, one envisages making do without a separate, for example electric drive for the mechanical switch device, and instead, effecting the switch-over between the switch positions solely by way of the liquid or fluid which is located in the hydraulic circuit. This means that according to the invention, a force transmission is effected from the circulation pump assembly onto the mechanical switch device via the fluid located in the hydraulic circuit. This means that the at least one mechanical switch device is hydraulically coupled, preferably exclusively hydraulically coupled, to the circulation pump assembly via the fluid in the hydraulic circuit. Thereby, preferably no further mechanical coupling is provided between the circulation pump assembly and the switch device. In particular, no coupling is provided between the rotor or the impeller of the circulation pump assembly and the switch device via a mechanical engagement of these components. This means that preferably an exclusively hydraulic coupling via the fluid is envisaged.

The hydraulic coupling permits the adaption of the speed of the circulation pump assembly and moreover the actuation of the switch device, via the speed controller. For this, a suitable hydraulic force is produced via the speed adaptation of the circulation pump assembly via the at least one hydraulic circuit, and this force via the hydraulic circuit acts upon the switch device and causes the movement of the switch device. Thus one can make do without a separate drive of the switch device. The switch device in contrast can be moved preferably solely by hydraulic forces which are transmitted via the hydraulic circuit. These hydraulic forces can be produced in a targeted manner by way of speed adaptation or by way of the control of the speed of the circulation pump assembly by the speed controller. Preferably, these are speed changes or speed adaptations which do not occur on normal operation of the hydraulic system, for example of a heating installation, or do not compromise this normal operation. The normal operation of the hydraulic system is thus not compromised by the switching of the mechanical switch device.

The mechanical switch device is preferably designed in a manner such that it reacts to pressure changes due to a speed change of the circulation pump assembly, in a manner such that the mechanical switch device is movable in dependence on the pressure or a change of the pressure, selectively into one of the switch positions. Thus for example it is possible for the switch device to be designed such that it moves into one of the two switch positions only on reaching a certain limit pressure. Thus one can succeed in the switch device e.g. being moved into a second switch position by way of increasing the pressure in the hydraulic system to or beyond this limit pressure. Thereby, the hydraulic system is preferably designed such that this limit pressure is not reached in the first switch position with normal operation, so that this first switch position can be safely retained in this operating condition. In a heating system for example, it is possible for service water heating to produce a higher pressure than is necessary for normal operation of the heating installation for heating a building. Thus the switch device, by way of increasing the pressure beyond a predefined limit value, can be moved into the second switch position which for example can be used to heat service water via the installation, as is described hereinafter.

Alternatively, it is also possible not to design the switch device with regard to its switching function in a manner dependent on the absolute value of the pressure, but to design it such that it reacts to certain changes of the pressure, so that a switch-over from one switch position into the other can be achieved by way of targeted pressure changes. Thus in particular the switch device with regard to its switch function can be dependent on the speed of the pressure change, so that it is designed for example such that with a rapid pressure change, it moves into a first switch position and with a slow pressure change into a second switch position.

According to the invention, one preferably envisages designing the switch device in a manner such that it reacts to differences in the course of a pressure build-up of the fluid, given a speed change of the circulation pump assembly, in order to initiate a movement between the two different switch positions. This means that according to the invention, a combination of a circulation pump assembly and a mechanical switch device is provided, which utilizes a variability of the circulation pump assembly which has not been used until now, for moving the switch device. Whereas the speed of the circulation pump assembly which is to be reached on operation as a rule is determined and set by the desired flow or differential pressure in the hydraulic circuit, the running-up behavior of the circulation pump assembly in previous hydraulic systems, such as heating systems, as a rule has no influence on the actual operation of the system. Inasmuch as this is concerned, one preferably envisages the running-up behavior or the type or the course of a speed change of the circulation pump assembly, by way of variation, being used to move the switch device into a desired switch position via the hydraulic coupling. This means that the circulation pump assembly and the switch device are preferably designed such that the switch device is not moved into a desired switch position alone by way of variation of the end pressure to be reached and/or of the absolute flow or end flow to be reached in the hydraulic circuit, but in dependence on the course of a pressure build-up in the hydraulic circuit in dependence of a course of a speed change of the circulation pump assembly. For this, the switch device is preferably designed such that with a speed change of the circulation pump assembly with a first course of the pressure build-up, it moves into a first switch position, and with a speed change of the circulation pump assembly with a second course of the pressure build-up which is different to this first course, it moves into a second switch position. The drive of the circulation pump assembly is preferably activated via the speed controller in a different manner, in order to achieve the different courses of the pressure build-up. This means that no separate electric drive device for the switch device is necessary, and the single electrical component to be electrically activated is preferably the drive motor of the at least one circulation pump assembly. This drive motor can simultaneously be used to actuate the switch device which is designed in a correspondingly matching manner, by way of a suitable setting of the course of a speed change via the speed controller, from which a different course of the pressure build-up results.

Particularly preferably, the mechanical switch device is designed in a self-holding manner, such that it remains in the assumed switch position up to a predefined speed or speed change of the circulation pump assembly. Thus the circulation pump assembly after reaching the desired switch position in particular can be controlled or regulated in the conventional manner, e.g. in order to set a desired differential pressure via the circulation pump assembly and/or the desired flow in the hydraulic circuit. This regulation (closed-loop control) then has no influence at all on the selected switch position. This means that the pump assembly on operation is self-holding up to a defined speed or speed change which is to effect a change of the switch position of the switch device. This speed change is preferably a speed change in the form of an acceleration, which is to say an increase of the speed from standstill of the pump assembly or departing from a basis speed. The circulation pump assembly and the switch device are particularly preferably designed such that the speed of the circulation pump assembly is firstly reduced to such a basis speed or until standstill and then departing from the standstill or the basis speed, a desired course of the speed increase and thus a correspondingly desired course of the pressure build-up is selected which is suitable for moving the switch device into the desired one of the possible switch positions or holding it in a desired switch position, for switching between the first and the second switch position of the switch device.

Preferably, at least two different speed courses of the circulation pump assembly can be set by way of the speed controller, wherein the speed controller is further preferably designed in a manner such that the circulation pump assembly permits speed changes with at least two different acceleration courses. Thus the circulation pump assembly for example can be a circulation pump assembly with a drive motor which is closed-loop controlled in its speed, in particular with the help of a frequency converter. The speed controller thus can preferably be designed such that it can infinity vary the speed. Alternatively, the speed controller however can also be designed such that it can set at least two different predefined speeds or several predefined speeds. The speed courses in particular can be ramps on starting up the circulation pump assembly, and these are preferably set differently steeply by the speed controller, wherein the switch device is then preferably designed such that with a slow speed change, it assumes a first switch position and with a rapid speed change with a steeper ramp, it assumes a second switch position. The slow speed change effects a slow pressure build-up in the hydraulic circuit, and in contrast the rapid speed change effects a rapid pressure build-up in the hydraulic circuit. The differently quick pressure build-up is transferred onto the switch device which is designed such that it can react to the speed of the pressure build-up. The pressure build-up thereby can be effected in a continuous or constant manner, in particular with a speed increase. Alternatively, a stepwise speed change and thus a stepwise change, in particular increase of the pressure is possible. Thereby, a slow pressure increase for example can be designed such that it is effected in several steps or several stages, whereas the rapid speed increase is effected in a direct manner. Pauses which are longer than with the rapid pressure increase can be taken between the stages or steps for the slower pressure increase. It is to be understood that preferably the same end pressure as an operating pressure in the hydraulic circuit is always achieved with the different courses of the pressure build-up, so that after actuating the switch device, the operation subsequent to this can be effected without comprise in the conventional manner.

The speed controller can be part of a super-ordinate control device or one comprising further functions, which for example carries out a pressure and/or flow closed-loop control of the circulation pump assembly. This control device can additionally control the switching-over of the mechanical switch device. Alternatively, a separate control device coupled to the speed controller can also be provided for this.

The switch device is preferably designed such that the movements into the at least two different switch positions are effected with different temporal delays, wherein preferably the movements are effected along differently long paths and/or against differently great damping, inertia forces and/ or biasing forces. The movements into the different switch positions are thus preferably effected with different dynamics. The temporal delays, by way of the differently rapid pressure build-up in the hydraulic system, permit the switch device to be initiated into assuming or retaining a desired one of the possible switch positions. If the pressure for example is rapidly increased, the switch device can carry out a movement into a switch position which is subjected to a lesser delay or damping. A second, more greatly delayed movement, by way of the rapid pressure build-up due to the delay or damping is prevented or slowed down such that that switch position which requires a less delayed movement to be assumed, is reached more quickly. If however the pressure for example is increased more slowly, the delay can be compensated by the slow pressure increase, so that the switch device for example can be held in a switch position or moved into a switch position, in which the greater delay or damping acts. The differently rapid pressure build-up for example can be effected in a continuous manner with a different gradient or however also in a stepwise manner, e.g. with differently long pauses between the steps or stages.

A desired delay can be achieved in different manner, for example by way of differently long paths of the switch device having to be covered for the individual switch positions. Alternatively or additionally, damping elements can be applied and/or friction forces, inertia forces or biasing forces can counteract the movement for its delay. The switch device can also be designed such that the gravity counteracts a movement into the different switch positions, to a differently great extent. The switch device can be designed in a targeted manner such that a higher damping or delay occurs in at least one movement direction into a first of the switch positions, than in a movement direction into a second switch position. Thereby, it is to be understood that a movement into one of the switch positions in the context of the invention can also mean that the switch device remains in this switch position if it was already previously located in this switch position.

According to a preferred embodiment of the hydraulic system, the circulation pump assembly is connected to at least two hydraulic circuits, and the mechanical switch device is subjected to fluid pressure via at least one of the hydraulic circuits, in a manner such that the switch device can be moved by way of the forces produced by the fluid pressure. This means that the switch device is preferably subjected to the hydraulic pressure in one of the hydraulic circuits and which is produced by the circulation pump assembly, wherein the switch device is designed such that it reacts to the different course of the pressure build-up resulting with a speed change of the circulation pump assembly, in particular with a speed increase, as has been described previously, so that it can be moved into a desired switch position in dependence on the type of the course of the pressure build-up. The switch device for example can be arranged such that it is subjected to pressure via the first hydraulic circuit and effects a switching function in the second hydraulic circuit. However, with this function too, the switching-over or the movement of the switch device into the desired switch position is preferably not dependent on the absolute head of the reached pressure, but dependent on the type of pressure course in the hydraulic circuit connecting the circulation pump assembly to the switch device. Particularly preferably, both hydraulic circuits can be connected to the switch device and further preferably also both hydraulic circuits can be connected to the circulation pump assembly, wherein the pump assembly simultaneously causes a fluid flow in both hydraulic circuits, or causes a fluid flow in each case in one of the hydraulic circuits in a selective manner, which is to say in a preferably switchable manner.

Particularly preferably, the circulation pump assembly is connected to at least two hydraulic circuits, and the at least one mechanical switch device is designed as at least one valve with at least one movable valve element for changing the ratio of the flows through the at least two hydraulic circuits and in particular for switching-over a flow path between the at least two hydraulic circuits. Thus the two hydraulic circuits for example can be two circuits of a heating installation, for example a first circuit through a heat exchanger for heating service water, and a second circuit as a heating circuit in a building. The switch device can accordingly be designed as a valve, in particular a switch-over valve, in order to selectively lead the flow produced by the circulation pump assembly, into one of the hydraulic circuits. Thus preferably at least two switch positions of the mechanical switch device are provided, wherein the fluid flow through the first hydraulic circuit is effected in a first switch position, and through the second hydraulic circuit in a second switch position. The switching-over is preferably effected in dependence on the course of the pressure build up with a speed change, in particular on accelerating or starting up the circulation pump assembly from standstill or departing from a basis speed.

The switch device preferably comprises at least one first control surface, upon which a fluid pressure in a first of the hydraulic circuits, preferably a fluid pressure at the exit of the first hydraulic circuit acts, and at least one second control surface, upon which a fluid pressure in a second of the hydraulic circuits, in particular at the beginning of the second hydraulic circuit, or a fluid pressure at the pressure side of the circulation pump assembly acts. The fluid pressure at the pressure side of the pump assembly is preferably a fluid pressure directly at the exit side of the circulation pump assembly, which means at a location upstream of the essential hydraulic resistances in the connecting hydraulic circuit, at a location at which essentially no pressure losses have yet occurred. The first control surface in contrast is preferably impinged by a fluid pressure in the first hydraulic circuit, said pressure prevailing at a location in the hydraulic circuit downstream of the exit side of the circulation pump assembly, which means downstream of hydraulic resistances and thus at a location, at which a pressure loss has occurred compared to the exit side of the pump. Particularly preferably, the first control surface is subjected to a fluid pressure at the exit of the first hydraulic circuit, which means at a location downstream of the essential hydraulic resistances in the hydraulic circuit, particularly preferably adjacent the suction side of the circulation pump assembly. Thus on operation of the hydraulic system, the pressure difference between the first control surface and the second control surface and which is to be produced by the circulation pump assembly is present over this first hydraulic circuit.

In an alternative embodiment, instead of connecting the second control surface to the pressure side of the circulation pump assembly, the second control surface is connected to the second hydraulic circuit, in particular the exit of the second hydraulic circuit. Thus the switch device can be subjected to two different pressures which prevail in the two hydraulic circuits, in order to effect a switch-over of the switch device. The pressure in the two hydraulic circuits, in particular at their exits, in turn can be influenced via the speed or the speed changes of the circulation pump assembly with the help of the speed controller, so that a switch-over of the switch device can be effected via these hydraulic pressures. With this arrangement, the switch device thus in particular can be arranged directly on the suction side of the circulation pump assembly. If the two hydraulic circuits branch from a node point situated at the pressure side of the circulation pump assembly, and with their exits are connected to the control surfaces at the suction side of the circulation pump assembly, then the characteristics of the hydraulic circuits with respect to pressure transmission can be utilized, in order to build up a fluid pressure at the two control surfaces in a differently quick manner, so that a switching-over of the switch device for example by way of a displacement of a valve element can be achieved by the thus produced pressure differences. In particular, the switch device can be designed such that one of the hydraulic circuits is always closed in one switch condition. A higher pressure builds up or a pressure is built up more rapidly in the closed hydraulic circuit than in the open hydraulic circuit, so that a greater pressure acts upon the control surface which is connected to the hydraulic circuit which is closed in the respective switch condition, and this effects a switch-over of the switch device.

The control surfaces are preferably connected to the at least one valve element, in a manner such that a fluid pressure acting upon the control surfaces causes at least one force acting upon the valve element, said force being directed at least partly in the direction of a movement axis of the valve element. This means that this force acting upon the valve element has a force component in the direction of the movement axis of the valve element, so that it can be used to move the valve element, in particular into one or more desired switch positions or to hold it in such.

This means that the hydraulic force is used to move the switch device or its valve element between the at least two switch positions. The control surfaces can be mechanically connected mechanically to the valve element in a suitable manner, for example by way of valve rods or piston rods, or however particularly preferably directly on the valve element or formed as one piece with the valve element. The valve element thus particularly preferably itself comprises the control surfaces, upon which the fluid pressure acts. The valve element simultaneously serves for providing a switching function in the flow path of the hydraulic system, in particular for permitting a switch-over function between two hydraulic circuits. Thus one preferably envisages the valve element on the one hand influencing the fluid in the hydraulic system, for example throttling or mixing it in a suitable manner or switching over the flow path, and on the other hand the control surfaces being impinged by pressure by this fluid itself, so that the fluid itself can move the valve element. Thereby, preferably a movement of the valve element is not dependent alone on the absolute force or the absolute pressure of the fluid, but as described above, on the course of the pressure build-up.

Further preferably, the first control surface is larger than the second control surface. A pressure loss in the hydraulic circuit and which is to have no influence on the functioning of the switch device can be compensated by way of this design for example. The pressure loss can be compensated by a suitably enlarged control surface. As described below, in the case of a heating system for example, this can be the pressure loss in a primary heat exchanger, in which the fluid serving as a heat transfer medium is heated, or is cooled in the case of a cooling system.

According to a further preferred embodiment, the first and the second control surface are arranged in a manner such that the forces which are produced by the fluid pressure on the first and the second control surface at least partly are directed counter to one another. This means that the forces at least have force components which are opposed to one another. One succeeds in a resulting differential force arising between the two forces acting upon the control surfaces with this arrangement of the control surfaces, and this differential force can effect a movement of the switch device or its valve element in a desired direction.

Preferably, the first and the second control surface in the hydraulic system are placed and dimensioned such that given a speed change of the circulation pump assembly, a pressure build-up at the first control surface is effected more slowly than at the second control surface, wherein preferably with a first more rapid speed change, the more rapid pressure increase at the second control surface effects a movement of the switch device, wherein with a second relatively slower speed change, a pressure build-up at the first and second control surface is effected in such a slow manner that a force equilibrium of the forces acting upon the control surfaces is retained. Preferably, as represented above, the first control surface is connected to the circulation pump assembly or the pressure side of the circulation pump assembly via a hydraulic circuit. This longer flow path and/or flow resistance, which is formed by the hydraulic circuit, leads to a delayed pressure build-up at the first control surface. If now the second control surface is situated closer to the pressure side of the circulation pump assembly, preferably directly downstream of the pressure side of the circulation pump assembly, then the flow path and/or the flow resistance between the circulation pump assembly and the second control surface is lower, so that the pressure build-up at the second control surface is effected more quickly. Thus with a rapid course of the pressure build-up, a pressure can bear on the second control surface more quickly than on the first control surface where it prevails in a delayed manner, and thus a resulting force arises on the second control surface for the time of the delay and this force can be utilized, in order to move the switch device or its valve element into a desired switch position. If in contrast the pressure build-up is effected slowly, then the delayed pressure build-up at the first control surface can be compensated in this manner, so that a force equilibrium on the first and the second control surface is retained, so that then preferably no displacement of the switch device or its valve elements occurs, so that the valve element remains in its previously assumed defined idle position. A basic pressure loss in the hydraulic circuit, as described above, can be compensated by different sizes of the control surfaces.

The pressure build-up which is caused by the hydraulic circuit alternatively or additionally can be effected by a bypass between the pressure side of the circulation pump assembly and the first control surface. For this, at least one delay element is present in the bypass, said delay element effecting a delayed pressure build-up or a delayed pressure transmission through the bypass, so that the described force equilibrium sets in. The first control surface is preferably arranged in a chamber which is separated from the hydraulic circuit but is mechanically coupled or connected in a force-transmitting manner to the valve element, in the case that the first control surface is subjected to pressure solely by the bypass. This design has the advantage that the switch function is independent of the design of the hydraulic circuit and functions even with a closed hydraulic circuit.

Different dynamic characteristics of the hydraulic circuits are therefore utilized with the previously described system, in order to achieve a displacement or a switch-over of the switch device with the help of different dynamics of the pressure build-up.

The control surfaces instead of acting upon one and the same valve element, can also act upon different valve elements, and other suitable counterforces, e.g. by way of biasing and delays can be effected by way of suitable delay elements, so that the differently quick pressure build-up can also then be used for moving in each case only one of the valve elements.

Preferably, the hydraulic system is designed such that the switch device in its idle position always moves into a defined one of the possible switch positions. Then the switch device can either persist in this first switch position or be moved into a second switch position, depending on the course of the pressure build-up. This in the context of the preceding description is to be seen as a movement between two possible switch positions in dependence on the course of the pressure build up. According to an alternative embodiment, the switch device can also be designed such that it can be moved between two switch positions by way of the hydraulic pressure which is produced by the circulation pump assembly. Thus it is not necessary for the switch device to always move back into an idle position.

Preferably, the switch device is additionally impinged by gravitational force, a magnet and/or spring force, which acts in the direction of the movement axis of the switch device, in particular in the direction of the movement axis of a valve element of the switch device. Such a gravitation force, magnet force and/or spring force forms a biasing force and for example can serve for holding the switch device or its valve element or valve elements in a predefined first switch position, in an idle position which is preferably given if the circulation pump assembly is still or moves at a basis speed. Alternatively, the switch device or a valve element of the switch device can also be impinged with a further hydraulic force as a restoring force, so that the hydraulic force leads the valve element or elements back into their idle position. The hydraulic force is preferably likewise a hydraulic force which is produced by the circulation pump assembly. The switch device can then moved from the mentioned first switch position into a desired second switch position or persist in the first switch position, by way of the selection of the speed or the course of a speed change or of a pressure build-up. The switch device can also be designed such that departing from the first switch position, the switch device or a valve element of the switch device can be moved into one or more possible further switch positions by way of a change of the pressure or different courses of the pressure build-up, if more than two switch positions are provided.

Particularly preferably, a biasing force, i.e. a gravity force, magnet force and/or spring force at least partly is directed counter to a force acting by way of the fluid pressure upon the second control surface. The force acting upon the second control surface is preferably a force which is produced by a fluid pressure at the pressure side of the circulation pump assembly. The switch device for example can be designed such that given a suitable pressure or course of the pressure build-up, the force on the second control surface becomes so large, that it overcomes an oppositely directed biasing force, which means e.g. oppositely directed gravitational force, magnet force, or spring force, and thus moves the switch device into a second switch position. The biasing force is preferably directed in the same direction as a force which is caused by the fluid pressure on a first control surface. Thus, the switch device can be designed such that if an adequately high pressure prevails on the first control surface, this pressure produces a force which together with the biasing force counteracts the pressure force on the second control surface in a manner such that no displacement or movement of the switch device occurs. As to whether such a force bears on the first control surface or not, can for example be dependent on the type of course of the pressure build-up, specifically on whether the pressure build-up is effected quickly or slowly. If the pressure e.g. in a hydraulic circuit, departing from the circulation pump assembly, propagates to the first control surface in a delayed manner, then a condition, in which only an adequately high hydraulic force acts upon the second control surface but not on the first control surface, can be achieved for example by way of a differently rapid course of the pressure build-up for example, in order to effect a switch-over of the switch device. Moreover, an adequate hydraulic force can also be produced by way of the circulation pump assembly being operated by the speed controller at a higher speed which causes a higher exit pressure.

According to a particularly preferred embodiment of the invention, the switch device comprises a valve element which is designed as a movable hollow cylinder, wherein its first axial end forms an entry opening which is connected or connectable to the second hydraulic circuit, and the hollow cylinder preferably in its peripheral wall comprises at least one second entry opening which is connected or is connectable to the first hydraulic circuit, and a second axial end of the hollow cylinder forms an exit opening which is connected to the entry of the circulation pump assembly. This means that with this design, fluid can flow out of the second hydraulic circuit through the first axial end of the hollow cylinder, through the hollow cylinder and flow out of the second axial end of the hollow cylinder to the circulation pump assembly. Alternatively or additionally, fluid can flow out of the first hydraulic circuit, e.g. via the entry opening in the peripheral wall, into the inside of the hollow cylinder and out of its second axial end to the entry of the circulation pump assembly. Alternatively, the second entry opening is formed between the second axial end of the hollow cylinder and an opposite wall, wherein the second entry opening is closed with a contact of the second axial end and the wall. The first entry opening at the axial end and the second entry opening can be selectively closed or opened to a different extent by way of the axial movement of the hollow cylinder. The entry openings each cooperate with a corresponding valve seat for this and this valve seat partly or completely closes the entry openings given a movement of the hollow cylinder. Thus a change of the mixing ratio between the two hydraulic circuits, or if one of the entry openings is completely closed, a switching of the flow between the two hydraulic circuits is possible. The hollow cylinder thus forms a valve element of a valve representing the mechanical switch device.

Preferably, the second axial end of the previously described hollow cylinder is in connection with a suction port of an impeller of the circulation pump assembly. Particularly preferably, the second axial end directly engages with the suction port of the circulation pump assembly, for example encompasses the suction port from the outer side or engages into the inner diameter of the suction port of the impeller. Alternatively however, further hydraulic connection elements can also be arranged between the hollow cylinder and the impeller. A very compact construction can be achieved and the switch device can be arranged directly on the circulation pump assembly or be integrated with this circulation pump assembly into a common construction unit, in a very simple manner, if the hollow cylinder is arranged directly adjacent the suction port.

Further preferably, the first and the second control surface, as has been described beforehand, are connected to the hollow cylinder in a force-transmitting manner. Particularly preferably, the first and/or the second control surface are formed directly on the hollow cylinder, in particular as one piece with this. Preferably, at least one control surface is formed by an axial end-face of the hollow cylinder. Thus the control surfaces which are necessary for the actuation or movement of the hollow cylinder can be directly arranged on the hollow cylinder in a very space-saving manner, which likewise favors a compact construction.

According to a particularly preferred embodiment, the second control surface is formed by at least one surface element which is situated in the pressure region of the circulation pump assembly and is preferably distanced to an impeller of the circulation pump assembly. Such a surface element for example can be designed in the form of one or more projections which extend away from the hollow cylinder, in particular in the axial direction. The distancing or spacing from the impeller has the advantage that a conventional impeller can be used, as is applied with circulation pump assemblies without the switch device according to the invention. The impeller, its suction port and in particular the sealing of the suction port can thus be designed in a conventional manner. With this design in particular, no component of the switch device moving relative to the suction port and having to be sealed directly with respect to the suction port is necessary. The surface elements for example can be situated for example on projections or pins, which in particular are led in a sealed manner through one or more openings in a partition wall between the pressure region and suction region in a pump casing of the circulation pump assembly.

A pressure in the pressure region of the pump assembly for example can act upon an axial end-face of one or more pins or projections which departing from the hollow cylinder extend into the pressure region.

The projections or pins, on which the surface elements are situated, are preferably movable together with the hollow cylinder in its axial direction, which is to say in the direction of its longitudinal axis. With such a movement however, the surface elements preferably remain in the pressure region of the pump assembly. Thus the surface elements ensure that the hollow cylinder, in a direction, which is to say in an axial direction, can be subjected to the fluid pressure at the pressure side of the circulation pump assembly, which means at the exit side of the impeller. The surface elements thus form the second control surface described above.

Instead of providing the mentioned surface elements on additional projections or pins, the surface element can also be formed by sections of the mentioned second axial end of the hollow cylinder, which is to say by a section of the axial end-face at the axial end of the hollow cylinder. It is also possible for the second control surface to be formed by the complete axial end-face of the hollow cylinder at its second axial end. In this case, the complete hollow cylinder then with its second axial end would engage into the pressure region of the pump casing. Thus the hollow cylinder e.g. with its second axial end can directly engage around or encompass the impeller or the suction port of the impeller, and a partition wall between the suction region and the pressure region of the pump casing can sealingly bear on the outer periphery of the hollow cylinder. This means that the hollow cylinder engages through an annular gap which surrounds the suction port of the impeller, into the pressure region of the pump casing.

The first control surface is preferably designed in the shape of a shoulder or a prominence on the inner periphery or outer periphery of the hollow cylinder and is in connection with a region of a hydraulic circuit which is connected to the circulation pump assembly. This first control surface, as described is preferably situated at the exit side of the hydraulic circuit, which is to say close to the suction side of the circulation pump assembly. The first control surface is thereby preferably directed oppositely to the second control surface, so that forces which are directed oppositely to one another arise at both control surfaces.

As described above, the hollow cylinder can additionally be subjected to a spring force and/or magnet force. Thus for example a compression spring can act upon the hollow cylinder in a manner such that it is pressed by the compression spring in the direction of its second axial end.

According to a further preferred embodiment of the invention, the valve element of the mechanic switch device is designed as a movable slide, whose axial face side which is first in the movement direction forms a first control surface and whose axial face side which is second in the movement direction forms a second control surface, wherein these control surfaces are each impinged by the fluid pressure from one of the hydraulic circuits, a fluid pressure at the suction side of the circulation pump assembly or a fluid pressure at the pressure side of the circulation pump assembly. Particularly preferably, with regard to the slide, it can be the case of a valve body which is freely movable in the direction of an in particular straight movement axis. The control surfaces of the movable slide form the front and the rear surface of the slide, seen in the movement direction, so that a pressure acting upon these control surfaces can produce a driving force in the movement direction of the slide.

The valve element which is preferably designed as the previously described slide, in a first switch position preferably closes the first hydraulic circuit and in a second switch position the second hydraulic circuit, wherein the valve element closes the hydraulic circuits with a surface which extends parallel to the movement direction and which is preferably limited by at least one seal. The seal is preferably movable in a manner such that it comes into sealing contact depending on the fluid pressure bearing on the surface delimited by the seal. One succeeds in the fluid pressure acting in the hydraulic circuits not acting directly upon the control surfaces of the valve element, by way of the fact that the closure of the hydraulic circuits is effected by a surface which is not directed in the movement direction of the valve element. In contrast, it is possible for example for at least one of the control surfaces to be impinged with a pressure from a hydraulic circuit only via a bypass, wherein such a bypass can be opened or closed for example via an additional valve. Particularly preferably, such a bypass can be formed by a leakage flow which flows past the valve element. The described movable seal can serve as a valve for opening and closing this leakage flow and this seal sealingly bears on an opposite wall, in particular a wall of the guide of the valve element, not until at a certain fluid pressure.

Further preferably, at least one of the first and the second control surfaces of the valve element faces a pressure space, on which a valve is situated, said valve being designed to control a pressure impingement of the pressure space with a fluid pressure from one of the hydraulic circuits, from the suction side of the circulation pump assembly or from the pressure side of the circulation pump assembly, wherein the valve preferably opens in a pressure-dependent manner. This design is also particularly preferably applied in combination with the previously described slide. The valve for example can be a spring-biased check valve. Thereby, the check valve is preferably arranged between the suction side of the circulation pump assembly and the pressure space, so that the check valve is opened with a sufficiently large suction at the suction side of the circulation pump assembly or a sufficiently large pressure difference across or over the valve. In this manner, the control surface which faces this pressure space can be pressure-relieved or be impinged with a force created by the suction.

According to a further preferred embodiment, the switch device is designed in a manner such that at least one of the two control surfaces is impinged with a fluid pressure from that hydraulic circuit which is currently at least partly closed by the valve element, for moving this valve element. The valve element which is designed as a slide is also preferably applied with this design. If one of the hydraulic circuits is essentially closed, then the pressure acting at the branching point or node point, at which the two hydraulic circuits separate, builds up in this closed hydraulic circuit. Thereby, it is assumed that the switch device is situated at the suction side of the circulation pump assembly and the mentioned node point at the pressure side. If the hydraulic circuit is partly closed, this for example means that a bypass or leakage flow described above can be present, in order to drive the valve element in a desired direction. Thus it is not the flow or the hydraulic pressure in the just opened hydraulic circuit which is used for moving the valve element, but a fluid pressure or a fluid flow from the just closed hydraulic circuit is utilized to move the valve element such that this circuit is opened and the other circuit is closed.

According to a further preferred embodiment, the switch device is designed in a manner such that the valve element can be moved to and fro between two switch positions by way of targeted pressure impingement which is dependent on the speed or the speed course of the circulation pump assembly. Thus a direct switching from the one switch position into the other switch position is always possible solely by way of activating the circulation pump assembly.

The mechanical switch device in the previously described embodiment examples forms a valve with preferably a single movable valve element.

According to an alternative embodiment of the invention, the mechanical switch device can comprise at least one first and one second movable valve element, of which the first valve element is arranged in the first hydraulic circuit and the second valve element is arranged in a second hydraulic circuit, wherein the first and second valve element have different dynamic characteristics. The first and the second valve element for example are differently greatly damped in their movement in the opening direction or are designed reacting in a delayed manner and/or e.g. have differently large biasing forces counter to the opening direction, for forming the desired dynamic characteristics. The first and the second valve element can be arranged in the first and second hydraulic circuit such that they lie at a branching location. This means that the first and second hydraulic circuit for example can branch from a common feed, at the first and second valve element, or the first and the second hydraulic circuit via the first and second valve element can run out into a connecting, common conduit section. Thus the two valve elements can serve for varying the ratio of the flows through the first and the second hydraulic circuit or effecting a complete change-over (switching) of the flow path between the first and the second hydraulic circuit, by way of one of the valve elements always being in a closed switch position and the other valve element accordingly always being in an opened switch position.

If both valve elements are situated at a branching, the common conduit section connecting to the valve elements, be its upstream or downstream of the valve elements, is preferably connected to the at least one circulation pump assembly. The effect of this design is that the fluid pressure which is produced by the circulation pump assembly acts via this common conduit section upon both valves to the same extent. Each of the valve elements comprises at least one respective control surface, upon which this fluid pressure acts, and which produces a force upon the valve element in the direction of its movement axis, via which force a movement of the valve element is possible. It is also possible for the valve elements to comprise a control surface in each case at their entry and at their exit side, so that a fluid pressure acts from both sides upon the valve element, and a movement of the valve element can be caused by way of a resulting differential force between both sides of the valve element. Particularly preferably, the valve elements are moreover subjected to a biasing force. This biasing force can be caused for example by a magnet force and/or spring force, as has been described above.

The two valve elements preferably have different dynamic characteristics, i.e. movement characteristics, in order to permit a reaction of the two valve elements to different pressures or different courses of the pressure build-up. Thus the valve elements for example in their movement direction between the switch positions can have differently large travels, can be damped to a differently great extent and/or have inertia forces, friction forces and/or biasing forces counter to this movement direction which are differently large. This means that given the same fluid pressure acting upon the valves, one of the valve elements will move more slowly or its movement will begin at a later stage, than the other valve element. Simultaneously or alternatively, the valve elements can be differently greatly biased, so that differently large forces, which is to say differently large fluid pressures, are necessary for moving the valve elements. Particularly preferably, the valve elements are biased by the biasing force in a manner such that they are held in a closed position by the biasing force. In this closed position, the valve elements are in contact with a corresponding valve seat or minimally distanced to the valve seat. This means that a minimal passage through the valve can be retained in the closed position, and this passage increases on opening the valve as is described further below. However, a reverse design is also possible, in which the valve elements are held in the opened condition by way of a biasing force and are moved into a closed position by way of the hydraulic pressure.

Preferably, the fluid pressure produced by the circulation pump assembly acts upon a control surface of the valve element, so that a force which counteracts a biasing or closure force of the valve elements and can move the valve element against the biasing force into a second switch position, i.e. into an opened or a closed switch position depending on the embodiment, arises on the control surface. The biasing forces are preferably directed and dimensioned such that they hold the valve elements in a first, e.g. closed switch position when the circulation pump assembly is out of operation or as described above, moves with a basis speed, at which no adequately high fluid pressure is produced for opening the valve elements which is to say for moving in their second switch position.

Particularly preferably, the first and the second valve elements are coupled in a manner such that always only one valve element can be located in its opened switch position or always only one valve element can be located in its closed switch position. This means that the other valve element then in each case remains in the other possible switch position. If one of the valve elements firstly moves into its second, i.e. opened switch position, then via the coupling it effects a blockade of the respective other valve element, so that this can then no longer move into the second opened switch position. With a reverse design, with which the valve elements move out of a first opened switch position into a second closed switch position, the coupling then has the effect that only one of the valve elements can move into the closed switch position, whereas the other valve element is then blocked such that it remains in its opened switch position. Thus a switch-over of the flow paths between the first and second hydraulic circuit can be realized. One of the two valve elements can be moved first of all out of its first into its second switch position in a targeted manner in combination with the different dynamic characteristics of the valve element which are described above, via a control of the course of the pressure build-up given a speed change of the circulation pump assembly, since one of the valve elements reacts more quickly to the pressure build-up.

Thus, for example, one of the valve elements can be subjected to a greater biasing force or closure force which is produced for example by a spring element, than the other valve element. The valve element which is subjected to the weaker biasing force is preferably simultaneously damped or delayed in its movement, so that it moves more slowly. With this design, with a rapid pressure build-up over the circulation pump assembly, one succeeds in the high biasing force on the first valve element being overcome by a suitably high fluid pressure, before the second valve element has moved into its second position. This is effected because the movement of the second valve element which already sets in at a lower pressure on account of the lower biasing force, is effected in such a delayed or slow manner, that the second switch position, in which the first valve element is blocked, is reached more slowly than the fluid pressure which is necessary for moving the first valve element. If the first valve element in its second switch position, i.e. opened or closed position depending on the embodiment, then it blocks the second valve element so that this can no longer completely or not at all move into its respective second switch position. If then reversely, the pressure course is selected such that a slower pressure increase is effected, or a further speed increase is firstly deferred or delayed after reaching the fluid pressure for overcoming the lower biasing force of the second valve element, then the second valve element can move slowly into its second switch position and reach this, before the fluid pressure is so large that the biasing force of the first valve element is overcome. If this higher fluid pressure is then reached, then the first valve element can no longer move into its second switch position, since it is accordingly blocked via the coupling to the first valve element.

Whereas a delay of the pressure build-up at a control surface is preferably achieved with only a single valve element via the connecting hydraulic circuit itself in the first embodiment example, this delay with the described second embodiment with at least two valve elements is preferably independent of the design of the connecting hydraulic circuit, since the slowing-down or delay of the movement of one of the valve elements can be caused by the design of the valve or the valve element itself.

The delay for example can be effected by a damping element on the valve element or however by way of design of the valve itself. Thus the valve for example can be designed such that hydraulic forces leading to a delay of the movement act upon the valve element. Thus e.g. a gap can remain also in the closed condition, between the valve element and an oppositely lying valve seat, through which gap a gap flow flows, which creates hydraulic forces which act counter to the opening force and thus lead to a delay of the opening movement.

The hydraulic system according to the invention is particularly preferably formed as a heating system and/or cooling system, wherein preferably one of the at least two hydraulic circuits runs through a secondary heat exchanger for the temperature control of service water, and one of the at least two hydraulic circuits runs through at least one object to be temperature controlled. The object to be temperature-controlled for example can be a building, and the second hydraulic circuit runs through one or more radiators or floor heating circuits of the building. A primary heat exchanger, through which the fluid is first delivered, in order to control it with regard to temperature, which is to say heat it or cool it, is situated upstream of both hydraulic circuits. The described mechanical switch device is preferably switched such that the fluid is delivered by the circulation pump assembly through that hydraulic circuit which runs through the described secondary heat exchanger, if service water is to be heated or cooled. If a temperature control of service water is not desired, then the mechanical switch device is brought into its other switch position, in which the fluid is delivered by the circulation pump assembly through that hydraulic circuit which runs through the object to be temperature controlled.

Such a design in particular is suitable with compact heating installations as are used for apartments and smaller buildings. With these installations, it is advantageous that one can make do without an additional drive for the switch device due to the switch device according to the invention which is actuated exclusively by way of variation of the speed course of the pump assembly, by which means the manufacturing costs for such a heating installation are reduced, and the failure risk is also reduced.

Further preferably, the circulation pump assembly and the at least one switch device are arranged in a common construction unit, in particular an integrated hydraulic construction unit for a compact heating installation. The subject matter of this invention is therefore also such a construction unit, in particular a construction unit for a compact heating installation, which comprises a circulation pump assembly and the at least one switch device. Thereby, the circulation pump assembly and the switch device preferably comprise at least one common housing part. It is to be understood that this construction unit can be realized with one or more of the previously described features, in particular with features of the switch device.

The arrangement in a construction unit means that the switch device and the circulation pump assembly are arranged in the constructional vicinity of one another. The integrated hydraulic construction unit for a compact heating installation usually comprises the circulation pump assembly as well as the necessary valves and sensors and is further preferably connected directly to a secondary heat exchanger. Thus in a heating installation it only needs to be connected via external pipework to a primary heat exchanger, a service water feed, a service water discharge and the connections of an external heating circuit. It thus forms the central hydraulic constituent of the heating installation. The integrated hydraulic construction unit is preferably formed from one or more components, in which the necessary flow paths between the switch device, the circulation pump assembly and the mentioned secondary heat exchanger are situated. Preferably, the components of the integrated hydraulic construction unit are manufactured as injection molded parts of plastic.

The switch device particularly preferably lies directly on the circulation pump assembly and is preferably integrated into a pump casing of the circulation pump assembly. Thus the switch device can preferably be arranged in the suction chamber of the pump casing, preferably behind or directly adjacently a partition wall separating the suction chamber from the pressure chamber of the pump casing. A particularly compact construction is therefore achieved. The switch device can alternatively also be integrated into the pump casing at the delivery side. The switch device preferably comprises three hydraulic connections, wherein a first hydraulic connection is connected directly to the suction side or the delivery side of the circulation pump assembly, a second hydraulic connection is connected to a hydraulic circuit running through a secondary heat exchanger and a third connection is connected to a hydraulic circuit which runs through an object to be temperature-controlled. It is particularly with an integrated, hydraulic construction unit that the connections are thereby preferably situated such that the second hydraulic connection is arranged at an angle, in particular at right angles, to the third hydraulic connection. The third hydraulic connection thereby preferably extends vertically downwards in the installed condition of the construction unit, whereas the second hydraulic connection extends horizontally. This is advantageous, since a secondary heat exchanger which for example can be designed as a plate heat exchanger, as a rule is situated at the rear side of the hydraulic construction unit in heating installations, whereas the external connections for connection of the hydraulic circuit running to an object to be temperature-controlled, as well as the further external connections, for example service water feed and service water discharge, as a rule extend vertically downwards. Thus the connections of the switch device can be connected directly to the necessary connections of the hydraulic construction unit or form these. The angled arrangement of the connections moreover favors the angled arrangement of the valve elements situated on the connections, in the manner described above, by way of which valve elements the coupling or the mutual movement blocking can be achieved.

The subject matter of the invention is also a method for operating a hydraulic circulation system with at least one circulation pump assembly and at least one mechanical switch device which is hydraulically connected to the circulation pump assembly and which can be moved into at least two switch positions, wherein a movement of the switch device between a first and a second switch position is effected by way of a speed adaptation of the circulation pump assembly, by way of which at least one hydraulic force acting upon the switch device and causing a movement of the switch device is produced. The speed adaptation, as described above, is preferably effected via a suitable speed controller. Different hydraulic pressures able to be used for moving the switch device can be produced in the hydraulic system by way of different speeds, as described above. The use of the speed adaptation of the circulation pump assembly for moving the switch device has the advantage that one can make do without a separate drive for the switch device and in contrast the components which are present in any case for the control of the circulation pump assembly can be additionally used to cause a switching or a movement of the switch device.

Preferably, a movement of the switch device between the first and the second switch position is effected in dependence on a pressure produced by the circulation pump assembly or in dependence on the course of the pressure build-up which is effected by the circulation pump assembly. Different pressures can then be produced by way of different speeds of the circulation pump assembly. A different course of the pressure build-up is caused by the different course of a speed change of the circulation pump assembly, in particular with a speed increase. The previous description of the device is referred to with regard to further details of the method. The functions or method procedures which result from the device features described above simultaneously represent preferred features of the method according to the invention.

Particularly preferably, the switch device is moved into a first switch position with a first course of the pressure build-up and the switch device is moved into a second switch position with a second pressure build-up which is different to the first course. A movement of at least one valve element between a first and a second switch position is thereby particularly effected if the switch device is designed as a valve. As described above, a movement can be caused for example by a more rapid pressure-build-up, whereas the switch device or its valve element remains in a first switch position in the case of a slower build-up.

The invention is hereinafter described by way of example and by way of the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 21 is a perspective exploded view of the pump assembly of the pump casing of the circulation pump assembly according to FIG. 20;

FIG. 22 is a perspective exploded view of the pump assembly according to FIG. 21, seen from the rear side;

DESCRIPTION OF THE PREFERRED EMBODIMENTS

Figure 1:
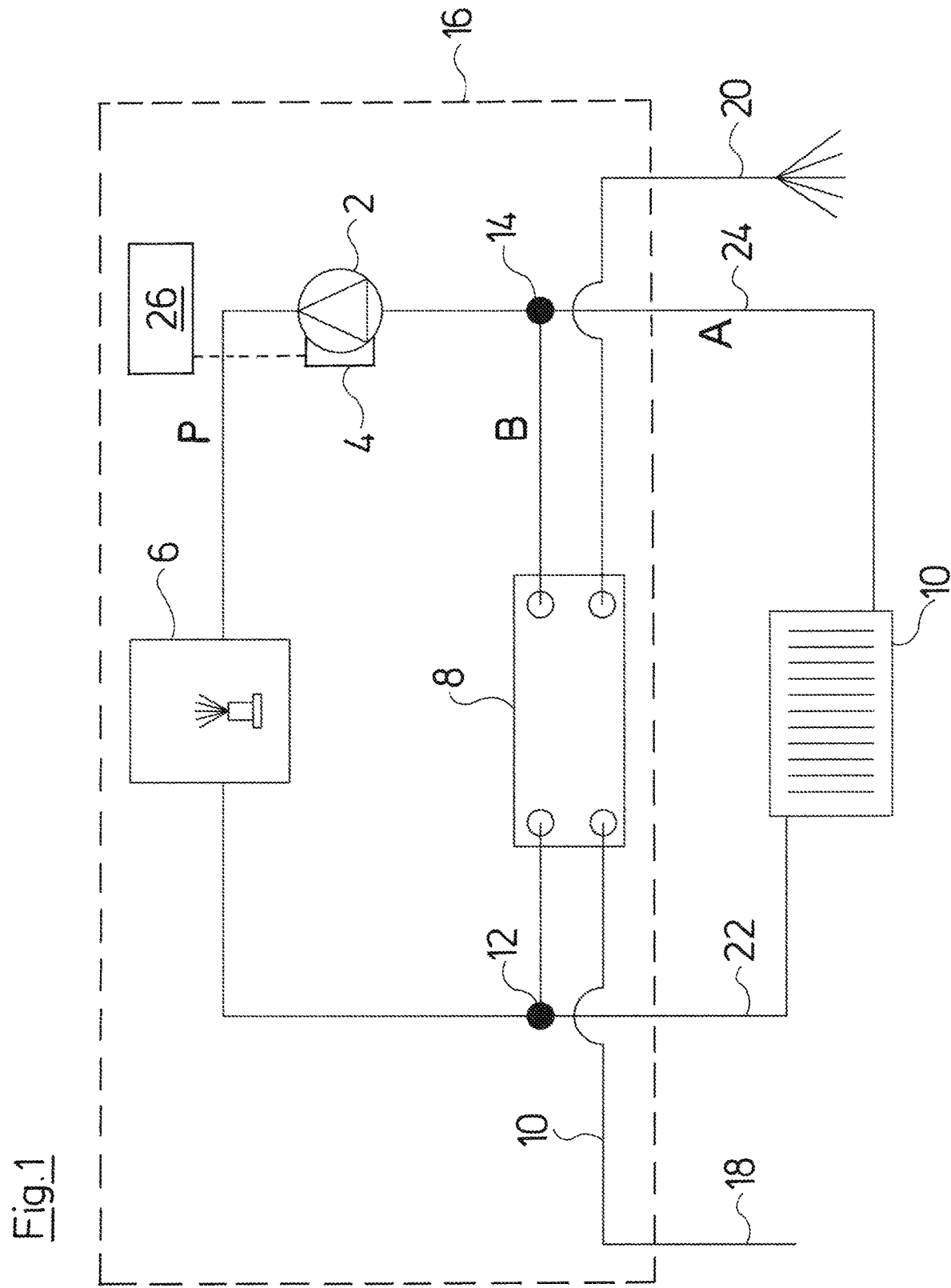
FIG. 1 is a schematic view of a hydraulic system according to the invention.

Referring to the drawings, FIG. 1 shows a heating installation as an example for a hydraulic system according to the invention. This heating installation uses a fluid heat transfer medium, in particular water, which is delivered in the circuit through the hydraulic system. The hydraulic system for this comprises a circulation pump assembly 2. The circulation pump assembly can be designed in a conventional manner, which is to say can comprise at least one impeller driven by an electric motor which is preferably designed as a canned motor, which is to say as a wet-running electrical drive motor. Further preferably, an electronic control is arranged directly on the circulation pump assembly or is integrated into the circulation pump assembly, by way of which control the pump assembly can be closed-loop controlled in its speed. The electronic control for this, in particular can comprise a frequency converter. The electronic control is particularly preferably arranged in an electronics housing or terminal box 4 which forms part of the circulation pump assembly 2 which means in particular is arranged directly on the motor casing or stator casing.

The hydraulic system moreover comprises a primary heat exchanger 6 which is arranged downstream of the circulation pump assembly 2. Here, the primary heat exchanger 6 is shown as a heating boiler. However, it is to be understood that the primary heat exchanger 6 for example can also be a cooling assembly or another heat source or cold source. The hydraulic system moreover comprises a secondary heat exchanger 8 which serves for the temperature control (here for heating) of service water. The secondary heat exchanger 8 for this comprises two flow paths, wherein the heating circuit running through the circulation pump assembly 2 and the primary heat exchanger 6 runs through a first flow path, and a service water conduit 10 for the service water to be heated runs through a second flow path. This flow path of the heating circuit through the secondary heat exchanger 8 forms a second hydraulic circuit B, whereas a first hydraulic circuit A as a room heating circuit leads through one or more radiators 10 of a building to be heated or temperature-controlled. It is to be understood that also other suitable heat exchangers, for example also one or more circuits of a floor heating could be applied as a heating body or radiator 10. The first hydraulic circuit A and the second hydraulic circuit B via the circulation pump assembly 2 and the primary heat exchanger 6 in each case form closed hydraulic circuits, in which the heat-transfer medium is circulated.

At the entry side, the hydraulic circuits A and B branch away from one another at a branching point 12 and at the exit side are connected to one another again at the second branching point 14. A switch device in the form of a switch-over valve which selectively opens one of the flow paths through one of the hydraulic circuits A and B and closes the flow path through the respective other hydraulic circuit is arranged at the branching point 12 or the branching point 14, in order to lead the flow of the heat transfer medium which is produced by the circulation pump assembly 2 through the hydraulic circuit at the exit side of the primary heat exchanger 6 selectively through the first hydraulic circuit A or the second hydraulic circuit B.

The part of the hydraulic system which is outlined in a dashed manner in FIG. 1 can be integrated into a heating installation, preferably into a compact heating installation 16, wherein all components with the exception of the primary heat exchanger 6 and the secondary heat exchanger 8 can be integrated into a construction unit such as a hydraulic block. Such a heating installation 16 then essentially comprises four hydraulic connections, specifically firstly a service water entry 18 and a service water exit 20 as well as, for the first hydraulic circuit A, a feed connection 22 and a return connection 24. The heating installation 16 is connected in the known manner to external pipework via these four hydraulic connections 18, 20, 22 and 24.

A switch-over valve which is electrically driven, in order, activated by a control device when heated service water is delivered, to lead the heat transfer medium through the secondary heat exchanger 8 and then, when heat is demanded in the room heating circuit, which is to say at the radiator 10, to lead heat transfer medium flow through the first hydraulic circuit A and thus through the radiator or radiators 10, is arranged in known heating installations 16 at the branching point 12 or the branching point 14. According to the invention, one now envisages making do without such a separate electrical drive of a switch-over device or a switch-over valve and effecting the switching-over solely by way of a suitable activation of the circulation pump assembly 2. A control device 26 is provided for this, which for example can be a central control device 26 which controls the primary heat exchanger 6 in the form of a burner and detects the service water demand via at least one suitable sensor. The control device 26 can be designed as a separate component or for example also be integrated with the control device of the circulation pump assembly 2 into a control device, in particular also completely arranged in the electronics housing 4 of the circulation pump assembly 2. The control device 26 provides the control of the circulation pump assembly 2 with a signal, as to whether a service water heating or a supply of the room heating circuit with the heat-transfer medium is desired. The electronic control of the circulation pump assembly 2 which forms a speed controller then controls the circulation pump assembly 2 such that the flow is selectively led through one of the hydraulic circuits A and/or B via a mechanical switch device in the branching point 12 or the branching point 14. Thereby, the mechanical switch device is coupled to the circulation pump assembly 2 in a purely hydraulic manner via the fluid, which is to say the heat transfer medium which is delivered by the circulation pump assembly 2.

Examples for such switch devices are described hereinafter.

Figure 2:
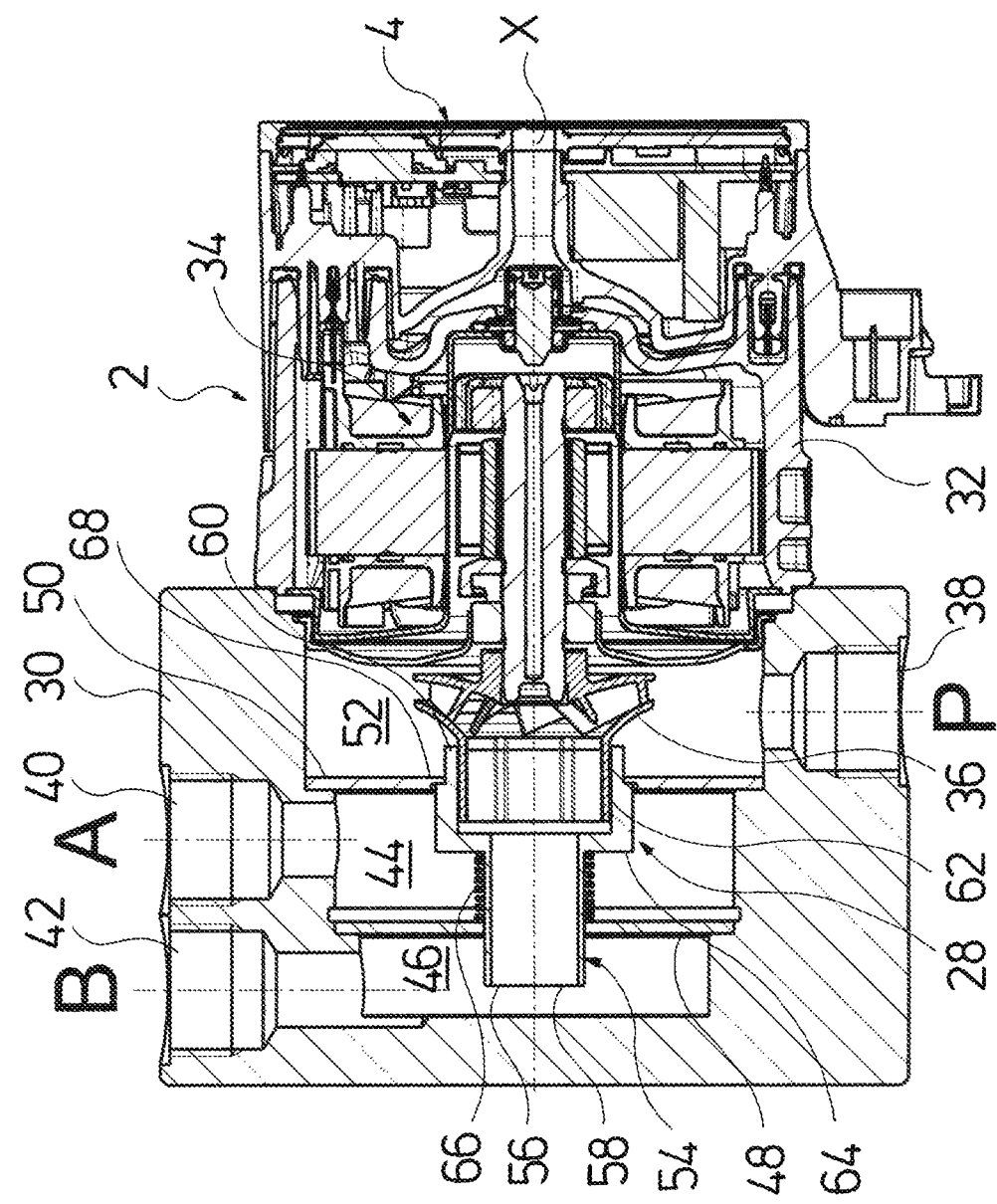
FIG. 2 is a sectioned view of a circulation pump assembly with an integrated switch device, according to a first embodiment of the invention.
Figure 3:
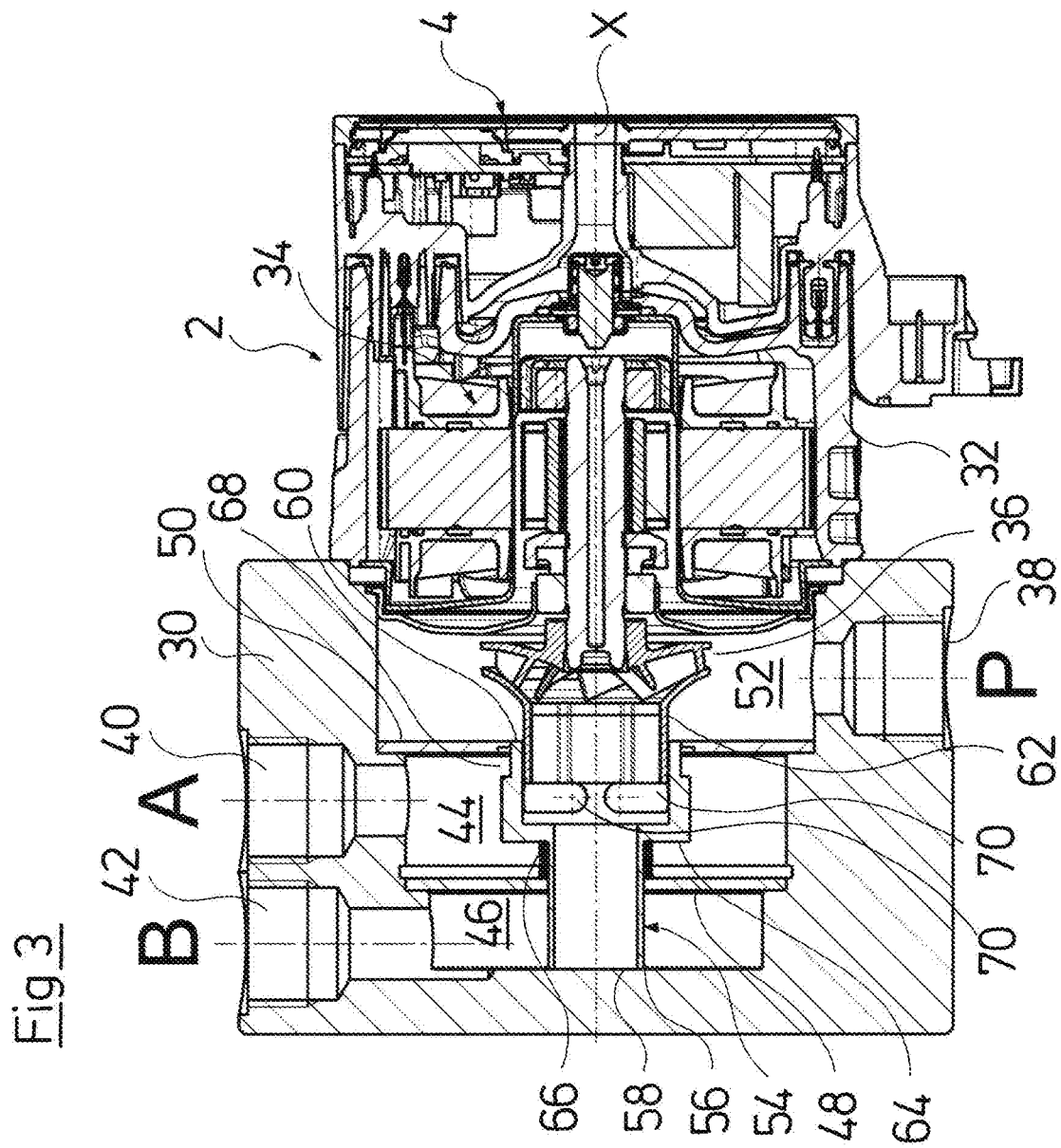
FIG. 3 is a sectioned view of the switch device according to FIG. 2, in a second switch position.

FIGS. 2 and 3 show a first embodiment example, with which the switch device 28 is integrated together with a branching point 14 into a pump casing 30 of the circulation pump assembly 2. A motor housing 32, in which an electrical drive motor 34 designed in a known manner and in the form of a canned motor is arranged, is connected to the pump casing 30. A terminal box 4 is arranged on the motor housing 32 at the axial side. The electrical drive motor 34 in the known manner, via a shaft drives an impeller 36 which rotates in the pump casing 30. The pump casing 30 in this example has three connections, specifically a pressure-side connection 38 for connection of the pressure-side, common branch P of the hydraulic circuit running through the primary heat exchanger 6, as well as two suction-side connections 40 and 42. The connection 40 is connected to the exit-side of the first hydraulic circuit A, and the connection 42 is connected to the exit of the second hydraulic circuit B. The connections 40 and 42 in each case run out in a chamber 44 and 46 in the inside of the pump casing 30. These suction-side chambers 44 and 46 are separated from one another by a partition wall 48. The suction-side chamber 44 is moreover connected at its other side by a further partition wall 50 to the pressure chamber 52 in the inside of the pump casing 30. The exit openings of the impeller 36 which are on the peripheral side run out into the pressure chamber 52. The pressure chamber 52 is moreover connected to the pressure-side connection 38.

The switch device for switching between two hydraulic circuits A and B is formed by a hollow-cylindrical valve element 54. The hollow cylinder of the valve element 54 extends with a first axial end 56 into the suction-side chamber 46. For this, the cylinder extends through an opening in the partition wall 48, wherein the inner periphery of the opening preferably essentially comes to sealingly bear on the outer periphery of the cylinder. FIG. 2 shows a first switch position of the valve element 54, in which the first axial end 56 is distanced to the opposite base 58 of the chamber 46. The opening at the first axial end 56 of the valve element 54 is opened in this position, so that a connection to the second hydraulic circuit B is created. The second axial end 60 of the hollow-cylindrical valve element 54 extends into the pressure chamber 52 and encompasses the suction port 62 of the impeller 36. The cylindrical suction port 62 is thereby designed in an adequately long or extended manner in the axial direction x, so that the hollow-cylindrical valve element 54 is displaceable in the axial direction x on the outer periphery of the suction port 62. The valve element 64 in the inside of the suction-side chamber 44 comprises a radially outwardly directed projection or shoulder 64 which forms an annular surface and is away from the second axial end 60. A compression spring 66 which presses the valve element 54 into its first switch position shown in FIG. 2 is arranged between this shoulder 64 and the partition wall 48. The opening at the first axial end 56 is opened in this first switch position, as described. The valve element 54 in this first switch position lies in its position which faces the impeller 36 the furthest. The movement in the direction of the impeller is limited by a step 68 on the outer periphery of the valve element 54, said step coming to bear on the partition wall 50. The valve element 54 extends with its region which is widened in its outer diameter at the shoulder 64, through an opening in the partition wall 50, into the pressure chamber 52, wherein the inner periphery of this opening in the partition wall 50 essentially sealingly bears on the outer periphery of the valve element 54. Thereby, the valve element 54 however is movable in the axial direction x, in the openings in the partition walls 48 and 50.

The switch position which is shown in FIG. 2 shows the idle position of the valve element 54 which the valve element assumes when the drive motor 34 is switched off.

FIG. 3 now in contrast to FIG. 2 shows the valve element 54 in its second switch position, in which the valve element is in its position which is distanced further to the impeller 36 in the axial direction x. In this second switch position, the first axial end 60 bears on the base 58 of the suction-side chamber 46, in the inside of the pump casing 30. The opening at the first axial end 56 of the valve element 54 is closed by way of this, so that no connection from the suction-side connection 42 and thus the second hydraulic circuit B to the suction port 62 of the impeller 36 is given. The second hydraulic circuit B is thus closed. The compression spring 66 in this second switch position is compressed to a greater extent than in the first switch position.

Moreover, the peripherally widened section of the valve element 54 has displaced in the axial direction x to the suction port 62 in the second switch position which is shown in FIG. 3, so that openings 70 in the peripheral wall of the hollow cylinder of the valve element 54 are released in this section. These entry openings or openings 70 in the first switch position which is shown in FIG. 2 are closed by the extended cylindrical periphery wall of the suction port 62. In the second switch position according to FIG. 3, the openings 70 are opened, so that a connection from the suction-side chamber 44 into the inside of the valve element 54 and thus into the inside of the suction part 62 of the impeller 36 is created. Thus the first hydraulic circuit A is connected to the circulation pump assembly 2 via the suction-side connection 40, the section-side chamber 44 and the inside of the valve element 54, so that fluid can be delivered through the first hydraulic circuit A in this switch position, when the drive motor 34 of the circulation pump assembly 2 is driven.

A switching-over between the previously described two switch positions is effected solely by way of the activation of the circulation pump 2 with the help of a speed controller, in a manner such that different courses of the pressure build-up are reached when running up. If, departing from standstill from the idle position shown in FIG. 2, the drive motor 34 is started up with a high acceleration, which is to say for example with a constant acceleration with a steeper ramp, then this leads to a quicker pressure build-up in the pressure chamber 52. The pressure which builds up there propagates via the pressure-side connection 38 through the branch P of the hydraulic circuit via the primary heat exchanger 6 and the branching point 12 firstly into both hydraulic circuits A and B and in the suction-side chamber 44 acts upon the shoulder 64 which forms a first control surface. The pressure in the pressure chamber 52 simultaneously acts upon the second axial end 60 which is to say the end-face at the second axial end 60 of the valve element 54 which forms a second control surface.

The pressure build-up in the room heating circuit requires a certain time on account of the length of the first hydraulic circuit A which forms this room heating circuit. Moreover, pressure losses occur in the radiators 10 and also in the primary heat exchanger 6. These pressure losses, in particular the pressure loss in the primary heat exchanger 6 can be compensated by way of the first control surface formed by the shoulder 64 being larger than the second control surface which is formed by the end-face at the second axial end 60. Thus firstly the complete exit-side pressure of the impeller 36 only bears on the second control surface, which means on the second axial end 60 of the valve element 54, on account of the delayed pressure build-up via the hydraulic circuit A. The surface ratios and the strength of the compression springs 66 as well as the speed of the pressure build-up are thus matched to one another such that a pressure force arises at the axial face side 60, and this pressure force counteracts the compression spring 66 in the axial direction X and exceeds its spring force, so that the valve element 54 on account of the occurring pressure force is moved into the second switch position which is shown in FIG. 3. This means that the valve element 54 is moved into its second switch position, in which the first hydraulic circuit A is opened and simultaneously the second hydraulic circuit B is closed, by way of the contact of the first axial face end 56 on the base 58, on account of this rapid start-up of the circulation pump assembly 2. If the openings 70 to the suction-side chamber 44 are now opened, then the suction-side pressure of the circulation pump assembly prevails in the suction-side chamber 44, and no pressure force which could support the compression spring 66 in moving the valve element 54 back into the first switch position acts upon the first control surface 64. This means that if the circulation pump assembly 2 after this acceleration continues to be operated at an adequate speed and adequate exit pressure in the pressure chamber 52, the valve element 54 is self-holding in this operating condition and the circulation pump assembly 2 delivers exclusively through the first hydraulic circuit A. Thereby, a further speed control of the circulation pump assembly 2 is possible for pressure regulation, as long as a minimum pressure, at which the force of the compression spring 66 would exceed the hydraulic force on the second control surface at the second axial end 60, is not fallen short of. The pressure in the pressure chamber 52 reduces and the hydraulic force at the second axial end 60 drops away and the compression spring 66 moves the valve element 54 back into the first switch position which is shown in FIG. 2 and which represents the idle position, when the circulation pump assembly 2 is switched off.

The pressure in the hydraulic system builds up more slowly if the circulation pump assembly 2 or its drive motor 34 is now accelerated more slowly out of this idle position, which is to say for example is started up in a constant manner with a shallower ramp. This means that the pressure builds up more slowly in the pressure-side chamber 52 or the pressure chamber 52 and the pressure in the first hydraulic circuit A also builds up more slowly, so that the delay of the pressure build-up is compensated, and a force equilibrium between the hydraulic forces acting on the first control surface formed by the shoulder 64 and on the second control surface at the second axial end 60 is retained, so that no hydraulic force which could move the valve element 54 into its second switch position counter to the force of the spring element 66 arises. This means that even after acceleration, the valve element 54 remains in the first switch position shown in FIG. 2 and is held in this position in a self-holding manner by way of the pressure acting on the shoulder 64, together with the compression spring 66. The heat transfer medium is then delivered in the circulation through the second hydraulic circuit B in this condition.

It is to be recognized that a switching between the two hydraulic circuits A and B by way of displacing the valve element 54 is possible alone by way of the different type of the course of the pressure build-up or the acceleration of the circulation pump assembly 2. If one is to switch from the second switch position shown in FIG. 3 back into the first switch position, it is then necessary to briefly stop the circulation pump assembly or to slow down the speed to a basis speed, at which the pressure in the pressure chamber 54 has reduced to such an extent that the spring force of the compression spring 66 can move the valve element 54 back into its first switch position. The described slow acceleration is then effected, in order to hold the valve element 54 in this first switch position. The different acceleration does not need to be effected in a constant manner with differently steep ramps. A stepwise or stage-wise acceleration with pauses between the individual speed increases could also be selected.

Figure 4:
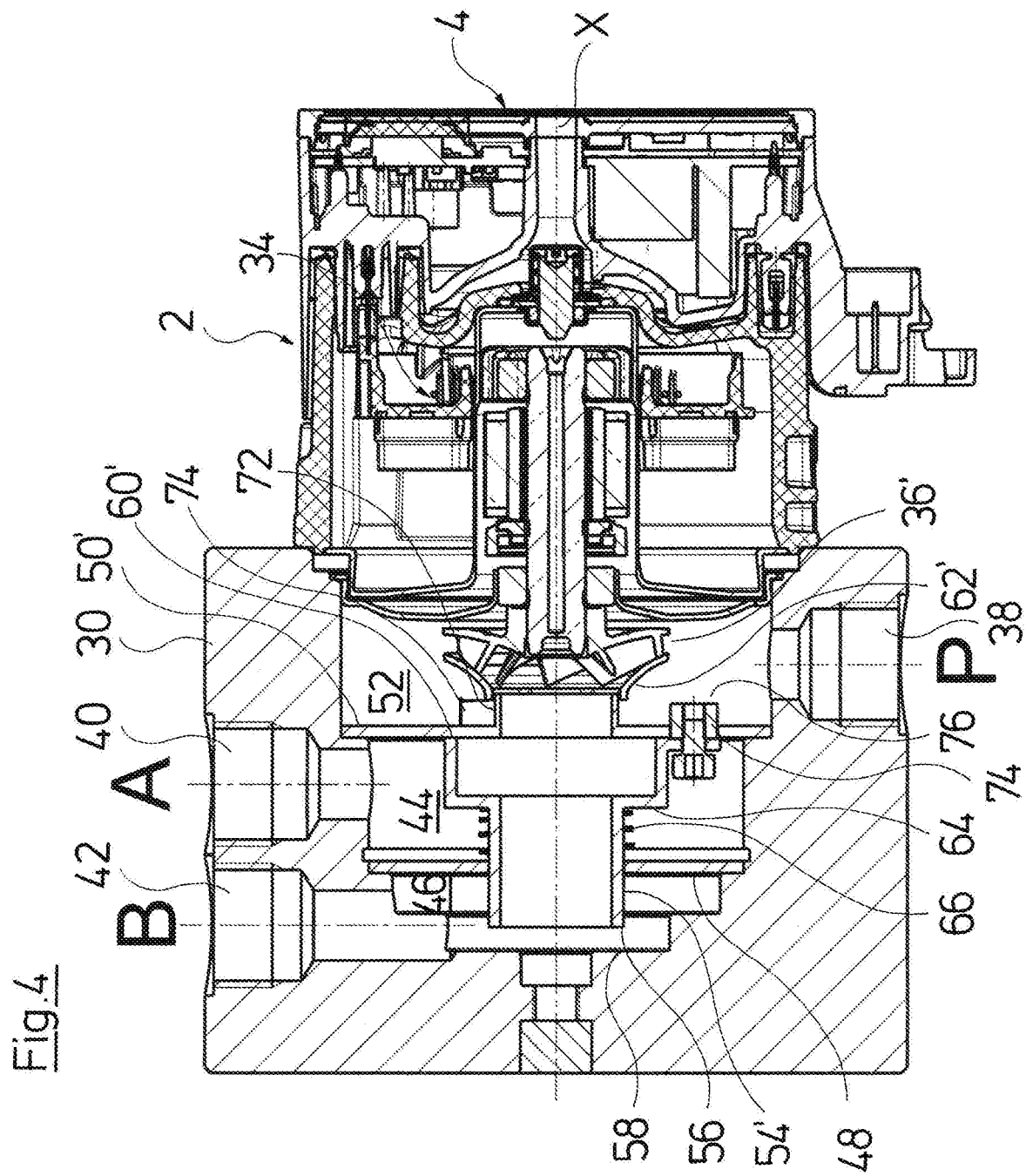
FIG. 4 is a sectioned view of the combination of a circulation pump assembly with a switch device according to a second embodiment of the invention.
Figure 5:
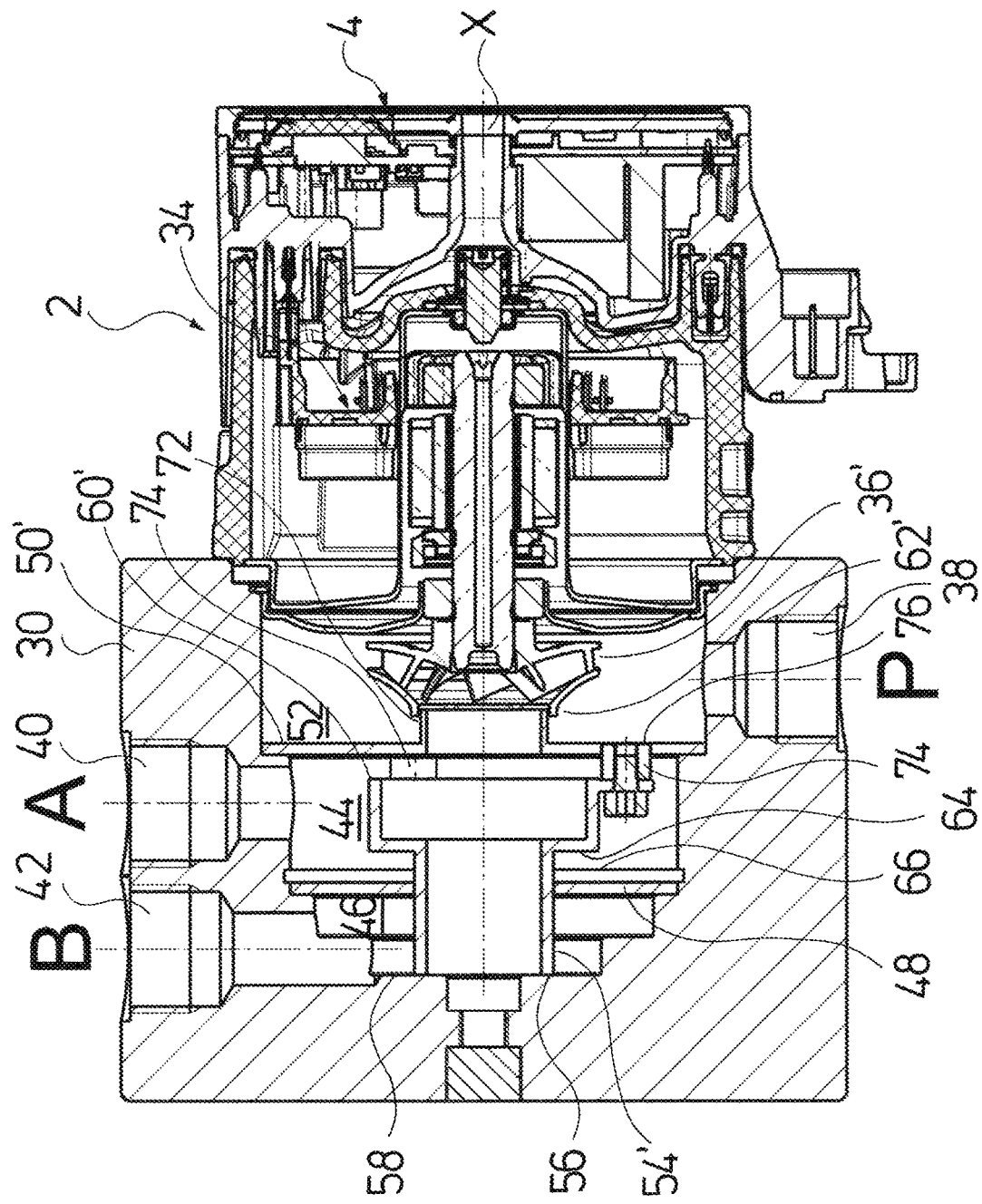
FIG. 5 is a sectioned view of the switch device according to FIG. 4, in a second switch position.

FIGS. 4 and 5 show a second embodiment of the invention which corresponds essentially to the first embodiment which was described by way of FIGS. 2 and 3. Only the differences are explained hereinafter. The main difference lies in the design of the second axial end of the valve element 54. With the second embodiment, the second axial end 60' does not extend into the pressure chamber 52. With this second embodiment, the second axial end 60' in the second switch position bears on the side of the partition wall 50' which faces the suction-side chamber 44 and thus simultaneously forms an abutment in the axial direction x. The impeller 36' has a shorter suction port 62', into which a tubular projection 72 on the partition wall 50' engages. The tubular projection 72 surrounds the opening in the partition wall 50' facing the suction-side chamber 44. In the shown first switch position in FIG. 4, the second axial end 60' of the valve element 54' bears on the partition wall or partition disc 50', so that a flow path from the suction-side chamber 44 to the suction port 62' of the impeller 36' is closed. A flow path through the projection 32 and through the inside of the valve element 54' to the suction-side chamber 46 and thus to the suction-side connection 42 is simultaneously opened, since the first axial end 56 is distanced to the base 58. In this first switch position, according to the first switch position which is shown in FIG. 2, therefore one delivers through the second hydraulic circuit B. In the second switch position which is shown in FIG. 5, the first axial end 56 bears on the base 58 and the flow path through the second hydraulic circuit B is closed, as is described by way of FIG. 3. The second axial end 60' of the valve element 54' is simultaneously distanced to the partition wall 50' so that a flow path from the suction-side chamber 44 into the inside of the tubular projection 72 and thus into the suction port 62' of the impeller 36' is formed by the gap between the partition wall 50' and the second axial end 60', and this gap forms an entry opening. Thus one delivers through the first hydraulic circuit A in this second switch position, analogously to the second switch position described by way of FIG. 3.

With this second embodiment example, the second control surface on the valve element 54' is replaced by pins 74 which extend away from the second axial end 60' in a manner parallel to the longitudinal axis X. The pins 74 extend through openings in the partition wall 50' into the pressure chamber 52, so that the axial face side 76 projects into the pressure chamber 52 or is subjected to or impinged by the pressure in the pressure chamber 52. The pins 74 are thereby led through openings in the partition wall 50', and these openings are distanced in the radial direction to the suction port 62' and the tubular projection 72. The pins 74 are led through the partition wall 50' or the opening formed in this, in an essentially sealed manner. Several pins 74 which are preferably distributed uniformly over the periphery are provided, and these pins are matched and selected such that their axial face sides 76 together form a second control surface which in its size is matched to the size of the first control surface formed by the shoulder 64, and to the spring force of the compression spring 66, in order to permit the switch-over functionality described in FIGS. 2 and 3, in dependence on the course of the pressure build-up. The switching-over is effected in the same manner as described in FIGS. 2 and 3, with the single difference that the pressure in the pressure chamber 52 does not act directly upon the second axial end 60' of the valve element 54', but upon the axial end-faces of the pins 74. With this embodiment too, it is such that the valve element 54 can be moved out of the first switch position shown in FIG. 4 into the second switch position shown in FIG. 5, by way of a rapid acceleration of the circulation pump assembly 2 and a rapid pressure build-up in the pressure chamber 52 entailed by this, on account of the delay of the pressure transmission via the first hydraulic circuit A, wherein this valve element then remains in this second switch position in a self-holding manner for the further operation. A force equilibrium or pressure equilibrium between the axial face sides 76 on the one side, and of the shoulder 64 as well as of the compression spring 66 on the other side is retained with a slow acceleration, so that no displacement of the valve element 54' occurs.

The two previously described embodiment examples relate to a switch device with a single valve element, which is provided for arrangement on the suction side of the circulation pump assembly 2, which is to say at the branching point 14. Further embodiments of the invention are hereinafter described, with which the switch device is provided as a valve with two valve elements, wherein embodiments are described for the arrangement at the branching point 12 or for the arrangement at the branching point 14.

Figure 6:
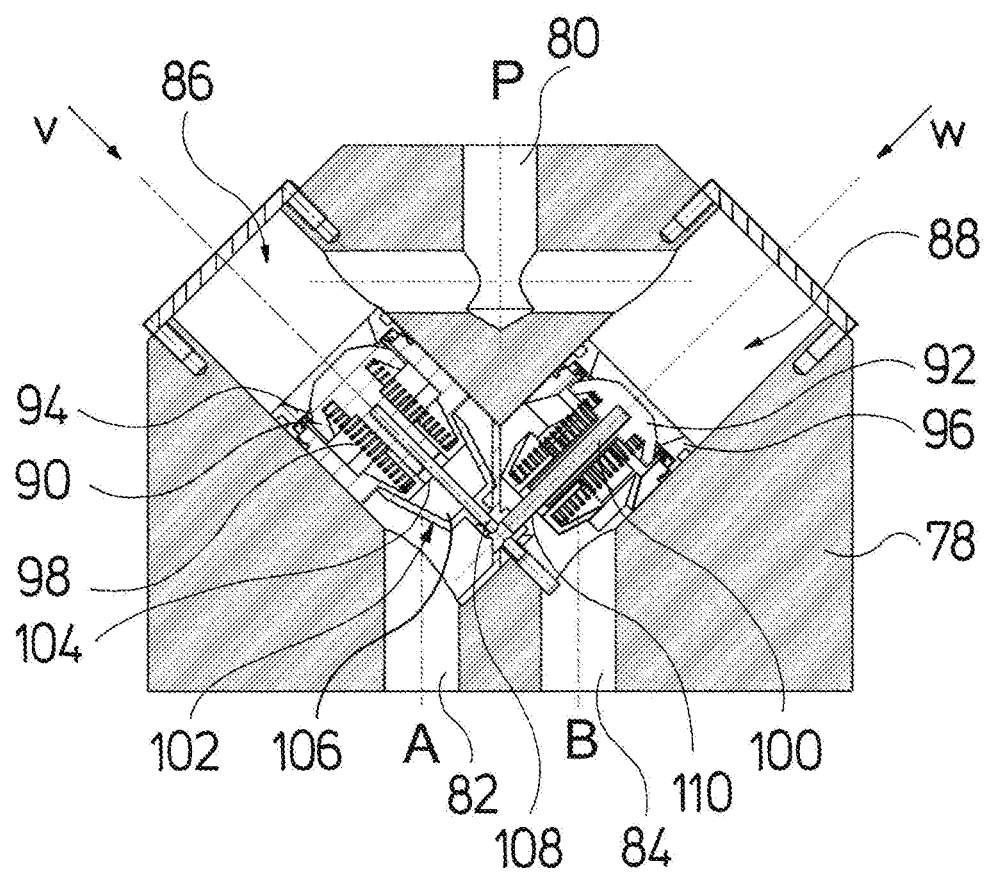
FIG. 6 is a sectioned view of a switch device for a hydraulic system according to the invention and according to a third embodiment.
Figure 7:
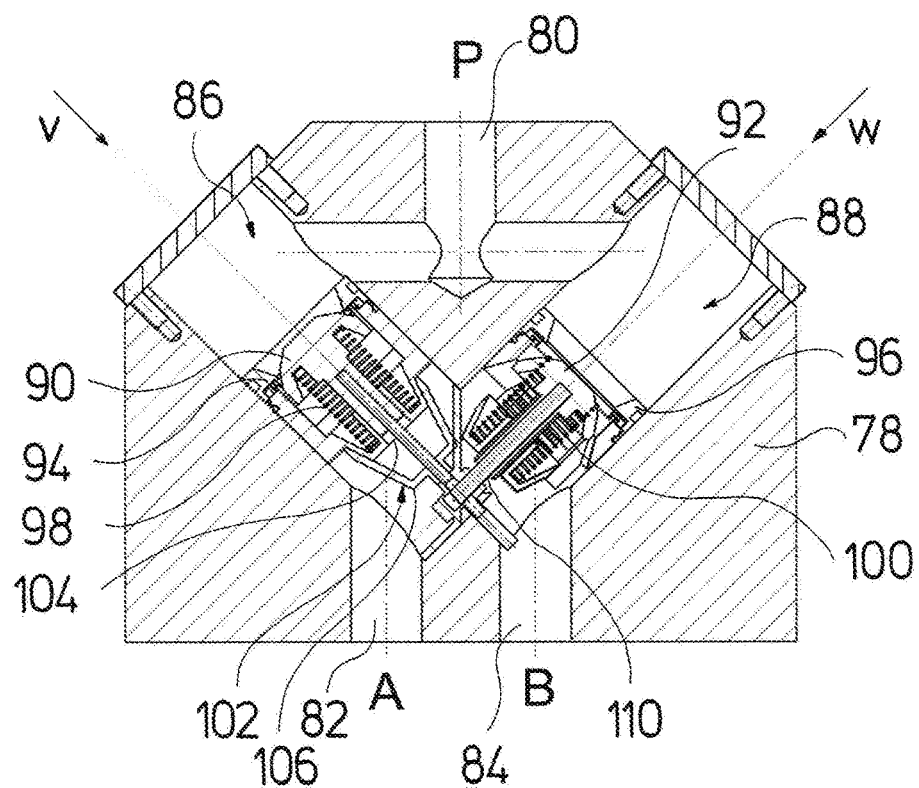
FIG. 7 is a sectioned view of the switch device according to FIG. 6, in a first switch position.
Figure 8:
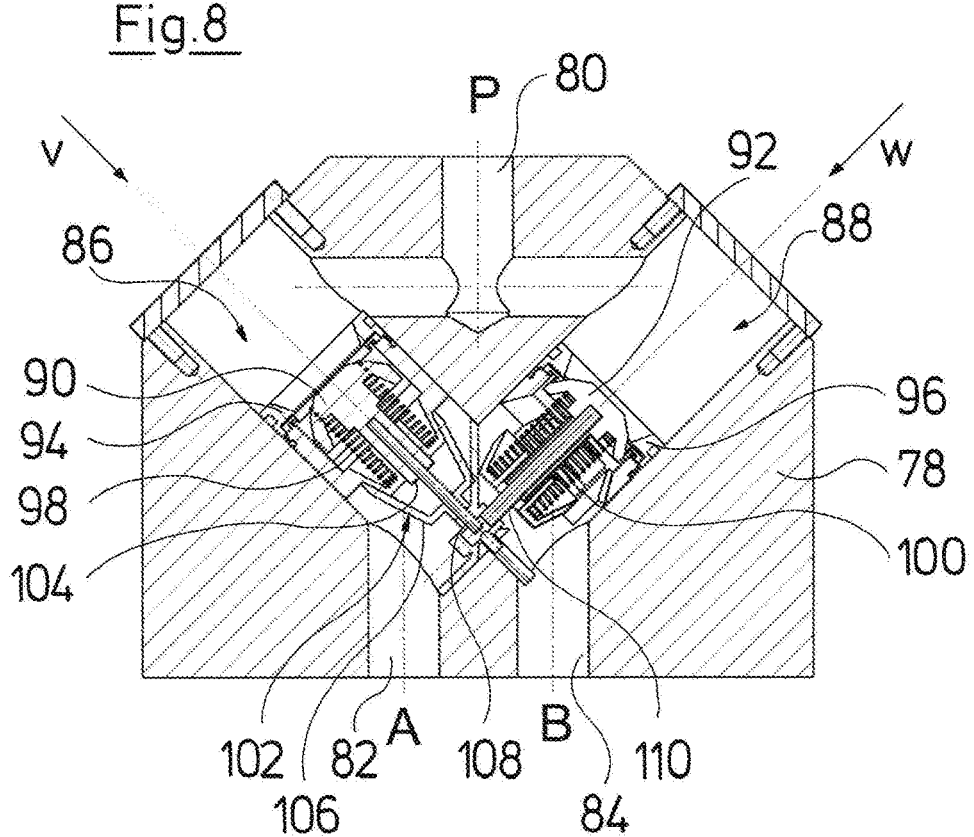
FIG. 8 is a sectioned view of the switch device according to FIG. 6, in a second switch position.

The embodiment of a switch device which is described by way of FIG. 6-8 is envisaged for the arrangement on the delivery side of the circulation pump assembly 2, which is to say at the branching point 12. Only the pressure loss of the primary heat exchanger 6 acts at this branching point 12, and the more significant pressure loss in the hydraulic circuits A and B is however effected between the branching points 12 and 14 through the secondary heat exchanger 8 and the radiators 10.

The switch device comprises a housing in the form of a valve block 78 which comprises a pressure-side connection 80 for connection to the branch P of the hydraulic circuits, which is to say to the exit side of the primary heat exchanger 6. The valve block 78 moreover comprises two exit-side connections 82 and 84, of which the connection 82 is connected to the first hydraulic circuit A, which is to say via the feed connection 22 to the radiators 10, and the connection 84 is connected to the second hydraulic circuit B which is to say to the secondary heat exchanger 8.

Two valves 86 and 88 are arranged in the valve block 78. The valves 86 and 88 together form a switch device and are each designed in the manner of check valves. Thereby, the valve 86 lies in the flow path between the connection 80 and the connection 82 for the first hydraulic circuit A and the valve 88 lies in the flow path between the connection 80 and the exit-side connection 84 for the second hydraulic circuit B. Both valves 86, 88 are closed in a first switch position, in the idle position shown in FIG. 6, which is to say that the valve element 90 of the valve 86 bears on the valve seat 94 and the valve element 92 of the valve 88 bears on a corresponding valve seat 96. The valve 86 comprises a compression spring 98 and the valve 88 a compressing spring 100, which produce a biasing force and press the respective valve element 90, 92 into the closed idle position shown in FIG. 6. The compression springs 98 and 100 are differently dimensioned. The first valve 86 has a weaker compression spring 98 than the compression spring 100 of the second valve 88.

Figure 18:
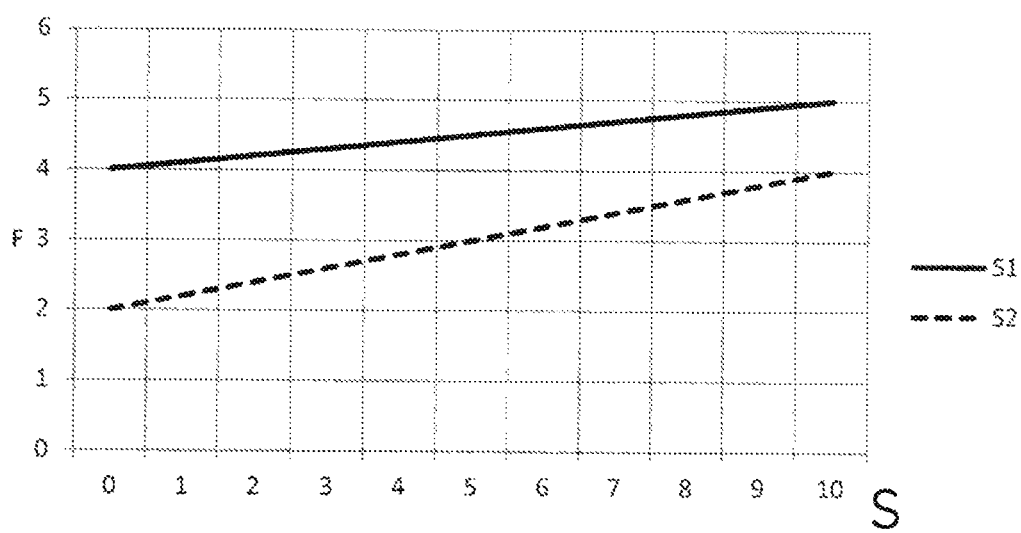
FIG. 18 is a graph schematically showing the two different spring characteristics of two valves according to FIGS. 6-12 as well as 16 and 17.

The different dimensioning of the compression springs 98 and 100 is represented in FIG. 18. FIG. 18 schematically shows a characteristic S1 of the compression spring 100 and the characteristics S2 of the compression spring 98. The force F is plotted over distance S in the diagram according to FIG. 18, wherein the force F in this diagram is not the spring force, but the produced pressure or the produced delivery head of the circulation pump assembly 2 at its delivery side. It is to be recognized that the weaker compression spring 98 produces a lower biasing force than the stronger compression spring 100. In the closed idle position, in which the associated valve element has not yet moved in the opening direction, a delivery head of 2 m is necessary in this example, in order to open the first valve 86, whereas a delivery head of 4 m is necessary, in order to effect an opening procedure of the valve 88 which comprises the stronger compression spring 100. It is simultaneously to be recognized that in this embodiment, the weaker compression spring 98 has a somewhat steeper spring characteristics S2, by which means the delayed movement of the valve 86 or its valve element 90 is encouraged. One can recognize from the diagram according to FIG. 18 that with a slow pressure build-up for example between 2 m and 4 m delivery head, the valve 86 with the weaker compression spring 98 can be opened by way of a movement of the associated valve element 90 into the second switch position, before the valve element 92 of the second valve 88 moves. Thus, the valve element 90 can firstly be moved into a position, in which the opening of the valve element 92 is blocked, before the pressure is increased to such an extent that the valve element 92 is moved into its opened opposition, as described below.

The valve 86 is additionally provided with a damping or delay device 102. The delay device 102 has a closed fluid-filled space, into which a cylindrical piston 104 of the valve element 90 immerses with its movement into the opened position. Fluid can escape out of the closed volume of the delay device 102 via an opening 106 functioning as a throttle location, when the piston 104 immerses into the volume. Thus a damping or delay of the movement of the valve element 90 in the opening direction v occurs.

In turn, it is possible by way of variation of the pressure build-up on accelerating the pump assembly 2, to open one of the valves 86 and 88 in a targeted manner by way of the combination of the weaker compression spring 98 with this delay device 102. The valve element 92, since it is not delayed in its movement, will move more quickly into its opening direction w than the valve element 90 which is delayed in its movement by the delay device 102, if a rapid pressure build-up, for example with a steep ramp for the acceleration or an abrupt increase to a high operating pressure is selected. A pressure which is only sufficient to overcome the spring force of the compression spring 98 which is designed more weakly, but is not yet sufficient to move the valve element 92 against the spring force of the compression spring 100, is firstly reached in the connection 80, if a slower pressure build-up with several steps or with a shallower ramp is selected for the acceleration and the pressure build-up. This means that the valve element 90 will the firstly move in the opening direction v into its opened switch position. The second valve element 92 only then moves against the compression spring 100, if the pressure acting upon the valve element 92 at its face side hydraulically facing the connection 80 is sufficiently large to overcome the counteracting spring force.

The valve elements 90 and 92 are moreover designed such that they are mechanically coupled or mutually block one another. The movement axes or opening directions v and w of the two valve elements 90 and 92 are angled at an angle of 90 to one another and intersect one another. Moreover, the valve element 90 at its axial end which is away from the valve seat 94 comprises a pin-like extension 108 which forms a guide pin. Accordingly, the second valve element 92 at its end which is away from the valve seat 96 comprises a pin-like extension 110 which forms a guide pin. The pin-like extension 108 extends in the direction of the movement axis or opening direction v of the valve element 90. The pin-like extension 110 extends along the longitudinal axis or movement axis or opening direction w of the second valve element 92. The pin-like extensions 108 and 110 are dimensioned such that if the valve element 90 is located in its opened position, its pin-like extension 108 projects into the movement path of the valve element 92, so that its pin-like extension 110 comes to bear on the outer periphery of the pin-like extension 108. This condition is shown in FIG. 8. This prevents the second valve element 92 from also being able to move into its opened position or switch position with a further pressure increase, when the first valve element opens firstly with a slow pressure build-up. This means that even if the pressure in the connection 80 and which acts upon the valve element 92 increases to such an extent that the hydraulic force exceeds the force of the compression spring 100, the valve element 92 can no longer move into its opened position. If conversely, the second valve element 92 is opened first of all, then its pin-like extension 110 moves into the movement path of the pin-like extension 108 of the first valve element 90, so that given an opening movement, the pin-like extension 108 of the valve element 90 abuts on the outer periphery of the pin-like extension 110, as is shown in FIG. 7. This means that the first valve element 90 can subsequently no longer move into its opened position, and a second switch position of the complete valve arrangement is achieved, when the valve element 92 firstly moves into its opened position or switch position with a rapid pressure build-up.

Thus with this embodiment too, the switch device can be switched solely by the hydraulic force which acts from the circulation pump assembly 2 onto the delivered fluid or the heat transfer medium. This hydraulic force acts in the form of a pressure upon the control surfaces of the valve elements 90 and 92. The delay of the pressure build-up from the circulation pump assembly 2 up to the valve element 90 and 92 is equal since the valve elements 90 ad 92 both lie at the branching point 12. Despite this, both valves 86 and 88 do not react equally rapidly, since the valve element 90 of the valve 86 is braked in its movement by way of the delay element 102, and thus the valves 86 and 88 have different dynamics.

Figure 9:
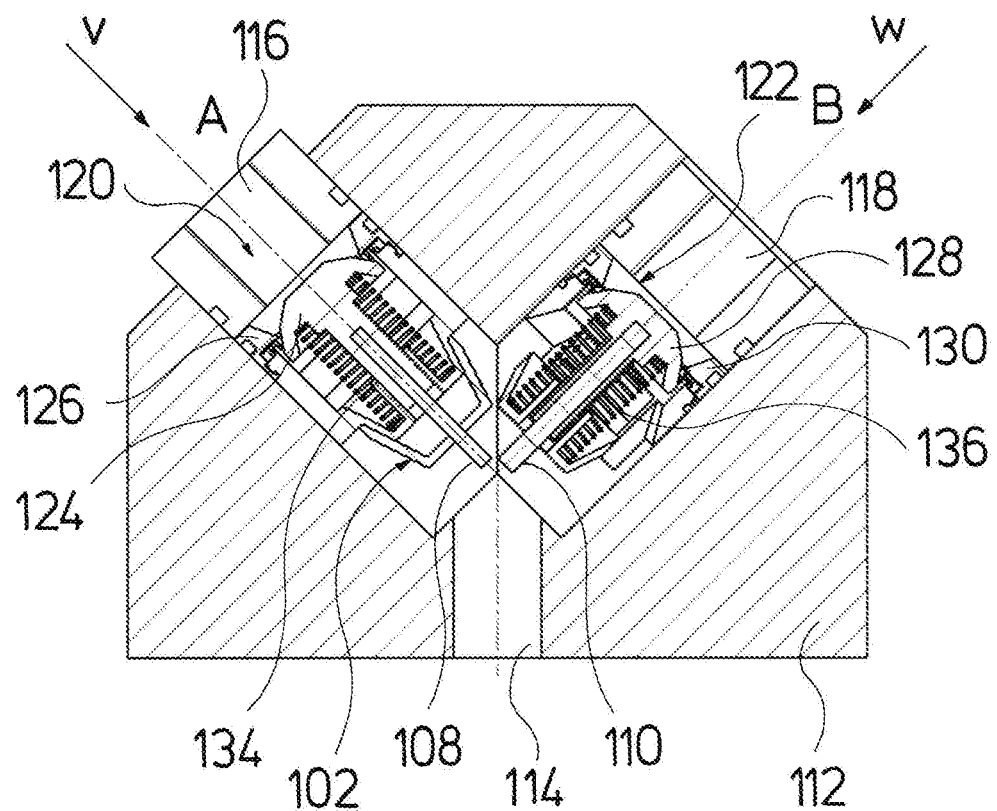
FIG. 9 is a sectioned view of a switch device for a hydraulic system according to the invention and according to a fourth embodiment.
Figure 10:
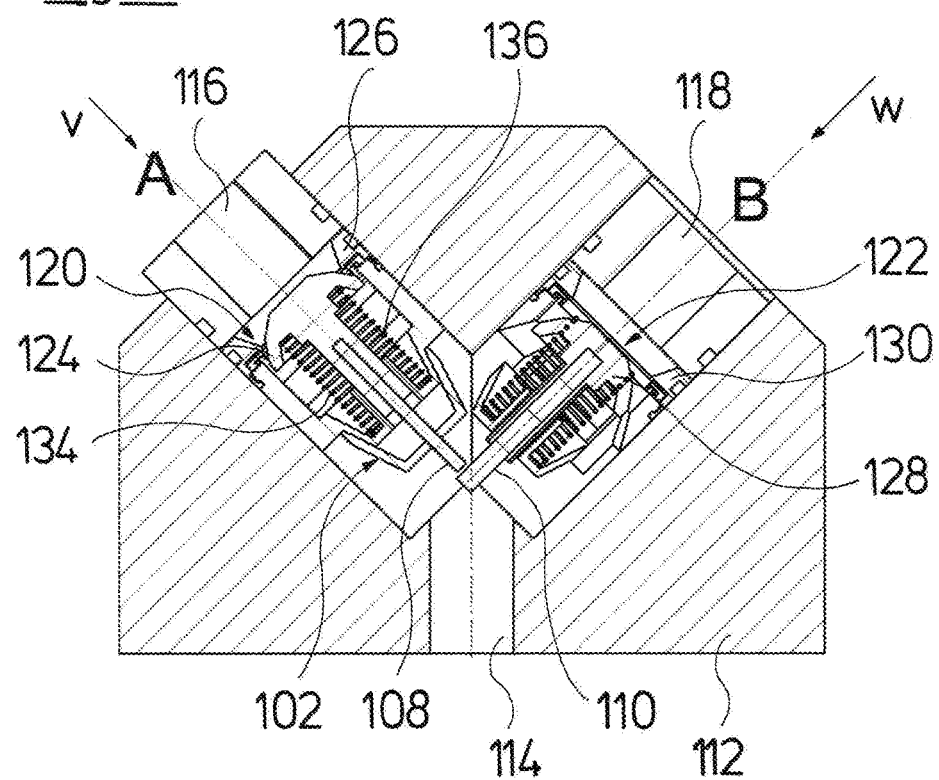
FIG. 10 is a sectioned view of the switch device according to FIG. 9 in a first switch position.
Figure 11:
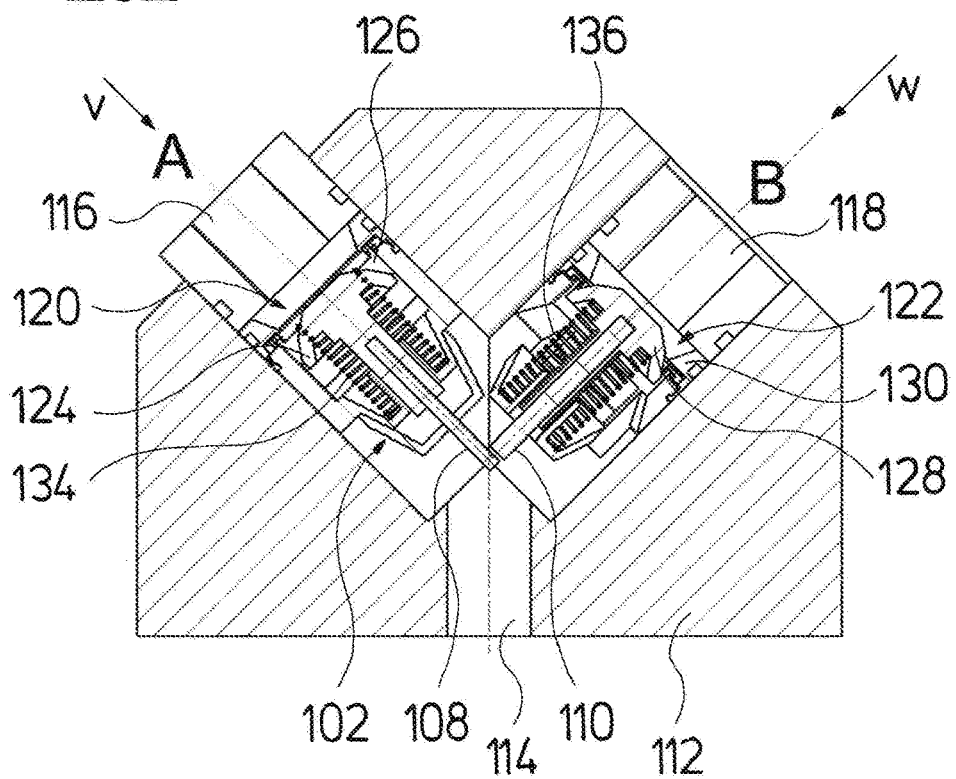
FIG. 11 is a sectioned view of the switch device according to FIG. 9 in a second switch position.

FIGS. 9-11 show a further embodiment example for a switch device similarly to the switch device which has been described by way of FIGS. 7 and 8, with the difference that the switch device according to FIGS. 9-11 is provided for arrangement at the branching point 14, which is to say is provided at the suction side of the circulation pump assembly 2.

With this embodiment, the valve block 112 comprises an outlet 114 which is provided for connection to the suction side of the circulation pump assembly 2. Moreover, two inlets 116 and 118 are present in the valve block, wherein the inlet 116 is connected to the exit side of the hydraulic circuit A and the inlet 118 is connected to the exit side of the hydraulic circuit B. This means that the inlet 116 has a connection to the return connection 24, and the inlet 118 has a connection to the secondary heat exchanger 8, inasmuch as the valve block 112 is applied with the embodiment example according to FIG. 1. A first valve 120 is arranged in the inlet 116 and a second valve 122 is arranged in the inlet 118. FIG. 9 shows the first switch position of the two valves 120, 122 which forms the idle position, wherein with regard to the valve 120, the valve element 124 bears on a valve seat 126. In the second valve 122, a valve element 128 bears on a valve seat 130. Each of the valves comprises a compression spring 132, 134 which press the valve elements 124 and 128 into the closed position shown in FIG. 9. With this embodiment too, the compression spring 134 is designed more weakly than the compression spring 136. I.e. the compression spring 136 has a greater spring constant and/or a greater biasing than the compression spring 134, as explained by way of the previous embodiment. The valve 120 moreover is provided with a delay device 102, as has been described by way of FIGS. 6-8. This description is referred to at this location. The valve elements 124 and 128 also comprise pin-like extensions 108 and 110 as have been described by way of FIGS. 6-8. A uniform pressure force does not act upon the valves 120 and 122 according to FIGS. 9-12, upon the control surfaces on the sides of the valve elements 124 and 128 which face the inlets 116 and 118, in contrast to the embodiment example according to FIGS. 6-8. Instead, a uniform suction force acts via the outlet 114 onto the opposite side of the valve elements 124 and 128. However, with this embodiment example too, a switching of the valves 120 and 122 can be achieved solely via the type of the course of the pressure increase on acceleration of the circulation pump assembly 2.

An adequately strong vacuum will build up at the outlet 114 and via the hydraulic circuit B a pressure will build up at the inlet 118 which displaces the valve element 128 against the compression spring 136 in the opening direction w and thus opens the valve 122, if a rapid acceleration with a rapid pressure build-up to a predefined pressure sufficient to overcome the stronger compression spring 136 is selected. The pin-like extension 110 of the valve element 128 simultaneously displaces into the movement path of the valve element 124 and its associated pin-like extension 108. Given an opened valve 122 thus an opening of the valve 120 delayed in its movement is therefore prevented by way of the pin-like extension 108 of the valve element 124 abutting on the pin-like extension 110. Thus a first switch position of the complete valve arrangement is achieved. The delayed movement of the valve element 124 is effected via the delay device 102. The pressure build-up to the inlet 116 via the first hydraulic circuit A can additionally be effected in a delayed manner, as described above by way of the first embodiment example. With a suitable design, this delay could also be sufficient to the extent that one could make do without the delay device 102 in this embodiment example.

Due to the lower spring force of the compression spring 134, firstly only the valve element 124 will move in the opening direction v as is shown in FIG. 11, if the pressure build-up is effected more slowly or in a stepwise manner, firstly to a pressure which is lower than the pressure which is necessary to displace the valve element 128 against the compression spring 136. I.e. the valve 120 opens first of all. The second valve 122 is then blocked via the pin-like extension 108, so that this valve can no longer open. Thus a second switch position of the valve arrangement formed by the valves 120 and 122 is achieved. The valve elements 124 and 128 are moved via their compression springs 134 and 136 respectively back into the initial position shown in FIG. 9, with the stoppage of the circulation pump assembly and the pressure reduction.

The arrangement of two valves 120 and 122 as has been described by way of FIGS. 9-11 can also be integrated directly into a pump casing 138 of a circulation pump assembly 2. With this arrangement shown in FIG. 12, the exit sides of the two valves 120 and 122 do not run out into a common outlet 114, as shown in FIGS. 9-11, but directly into the suction chamber 140 in the inside of the pump casing 138. The receiver for the valves 120 and 122 can thus be designed as one piece with the pump casing 138. Such a design in particular is suitable for being integrated directly into a compact heating installation, in particular into the hydraulic block of such a compact heating installation. Thus the inlet 116 can directly form the return connection 24 for the room heating circuit, and the inlet 118 can be directly connected to the secondary heat exchanger 8.

Figure 12:
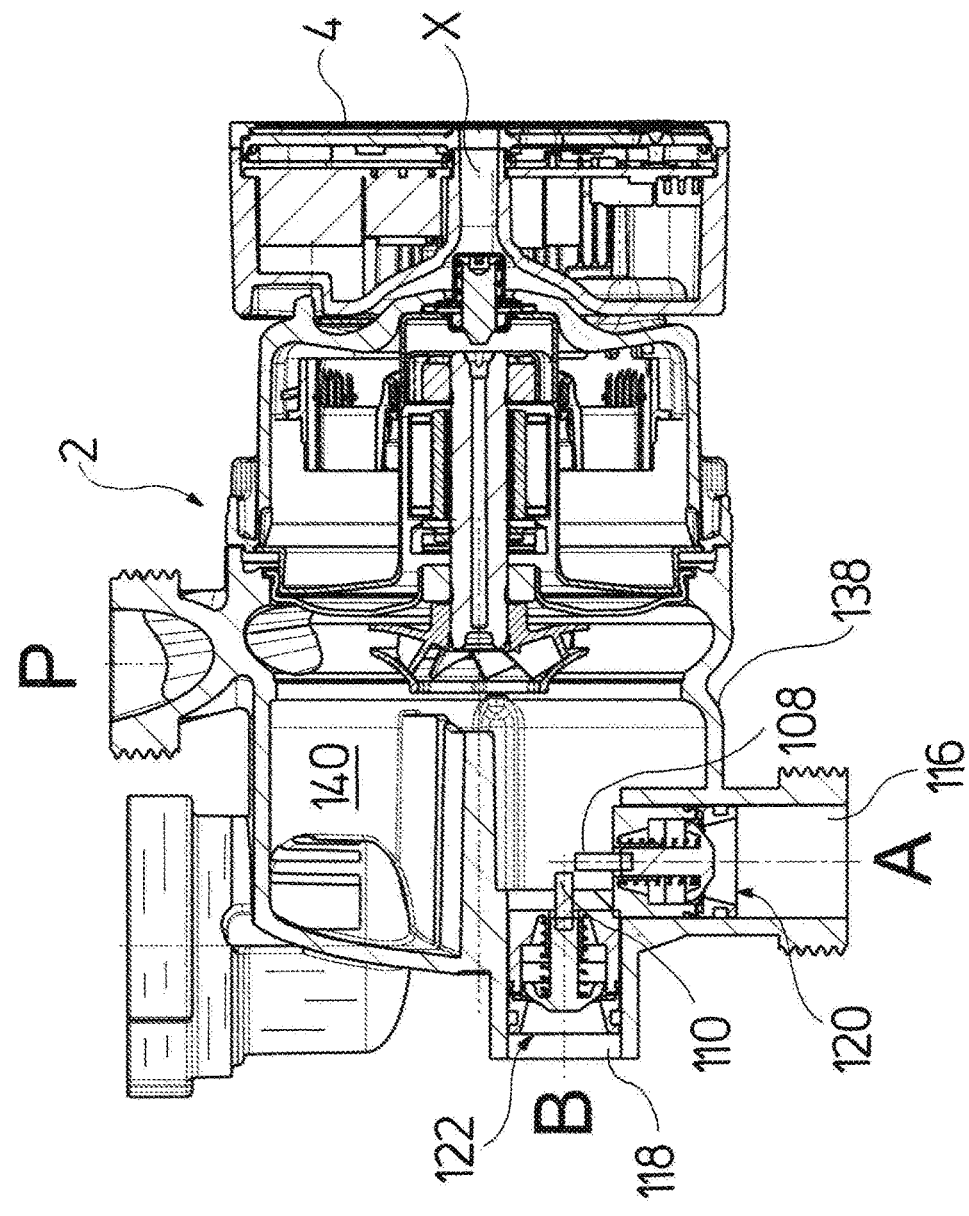
FIG. 12 is a sectioned view of a pump assembly with an integrated switch device according to a fifth embodiment of the invention.
Figure 13:
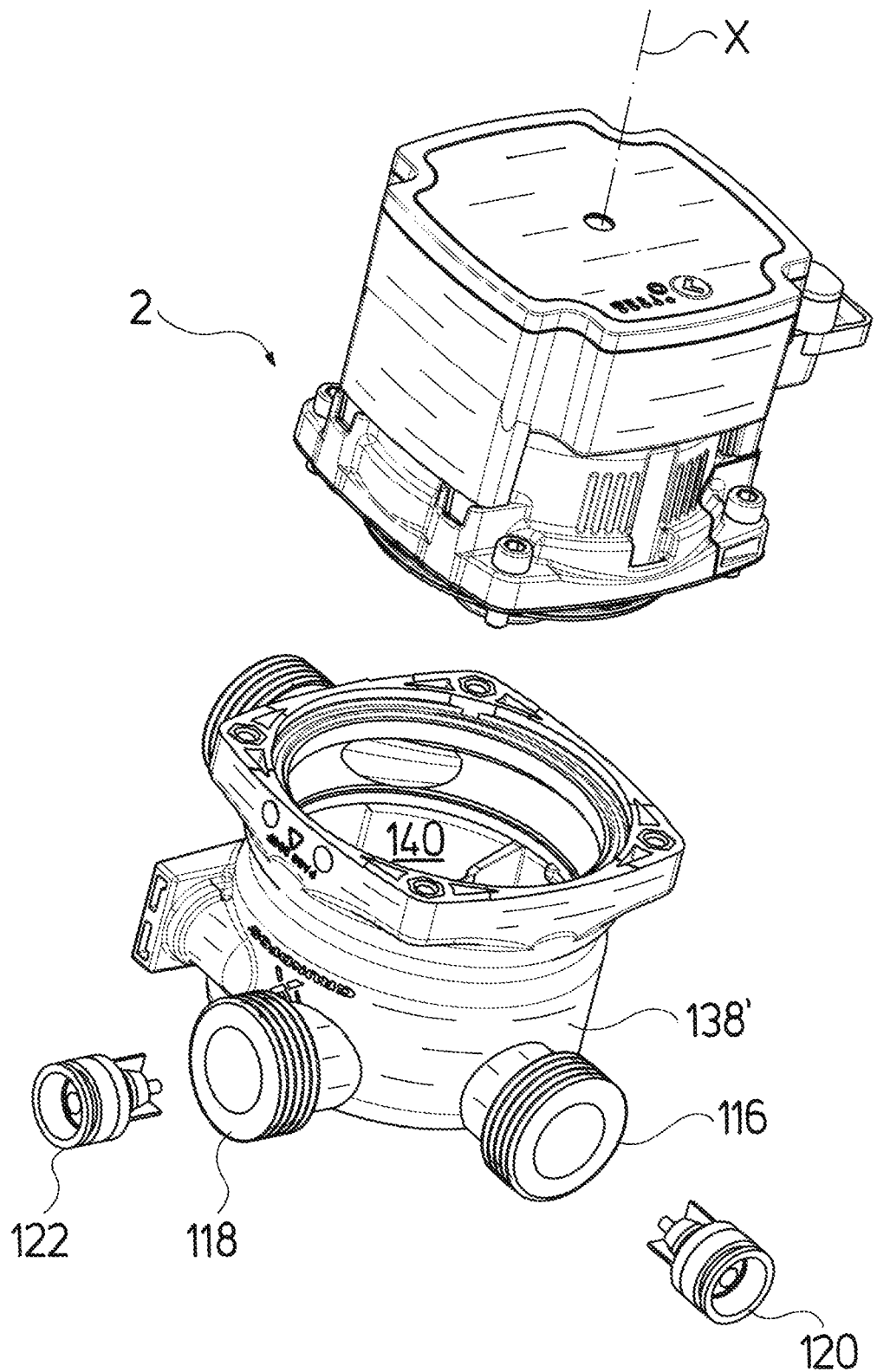
FIG. 13 is an exploded perspective view of a circulation pump assembly with an integrated switch device according to a sixth embodiment of the invention.
Figure 14:
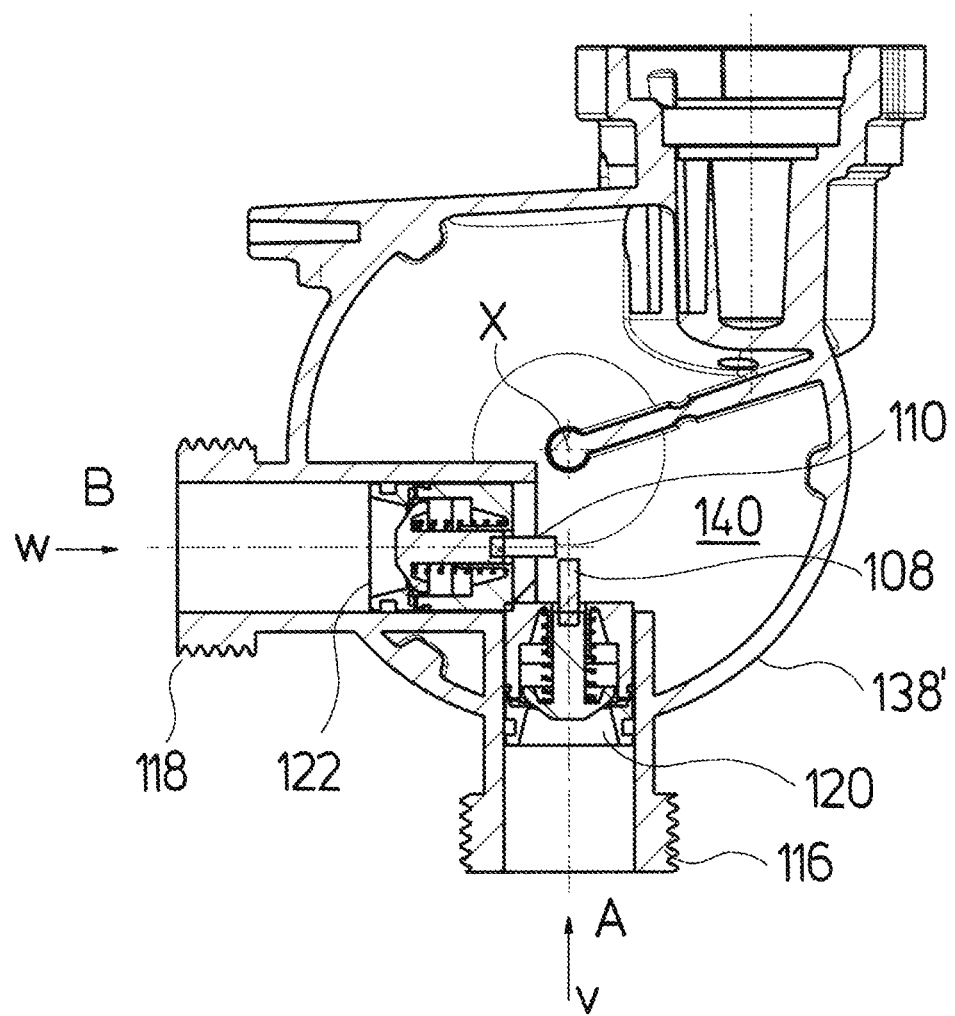
FIG. 14 is a sectioned view of the pump casing according to FIG. 13.

FIGS. 13 and 14 show an alternative design to the arrangement according to FIG. 12, and this differs from the arrangement shown in FIG. 12 only in that the inlet 118 is not directed to the rear side in a direction parallel to the rotation axis X of the circulation pump assembly, but laterally at an angle of 90 to the inlet 116, so that both inlets 116 and 118 are directed at right angles to one another and at right angles to the rotation axis X of the circulation pump assembly. Such an arrangement, compared to the arrangement shown in FIG. 12 can be advantageous if a secondary heat exchanger 8 is not to be applied onto the pump casing 138' at the rear side, but laterally.

The preceding description with regard to FIGS. 6-11 is referred to with regard to the manner of functioning of the valves 120 and 122 which form the switch device, with the embodiments according to FIGS. 12-14.

Figure 19:
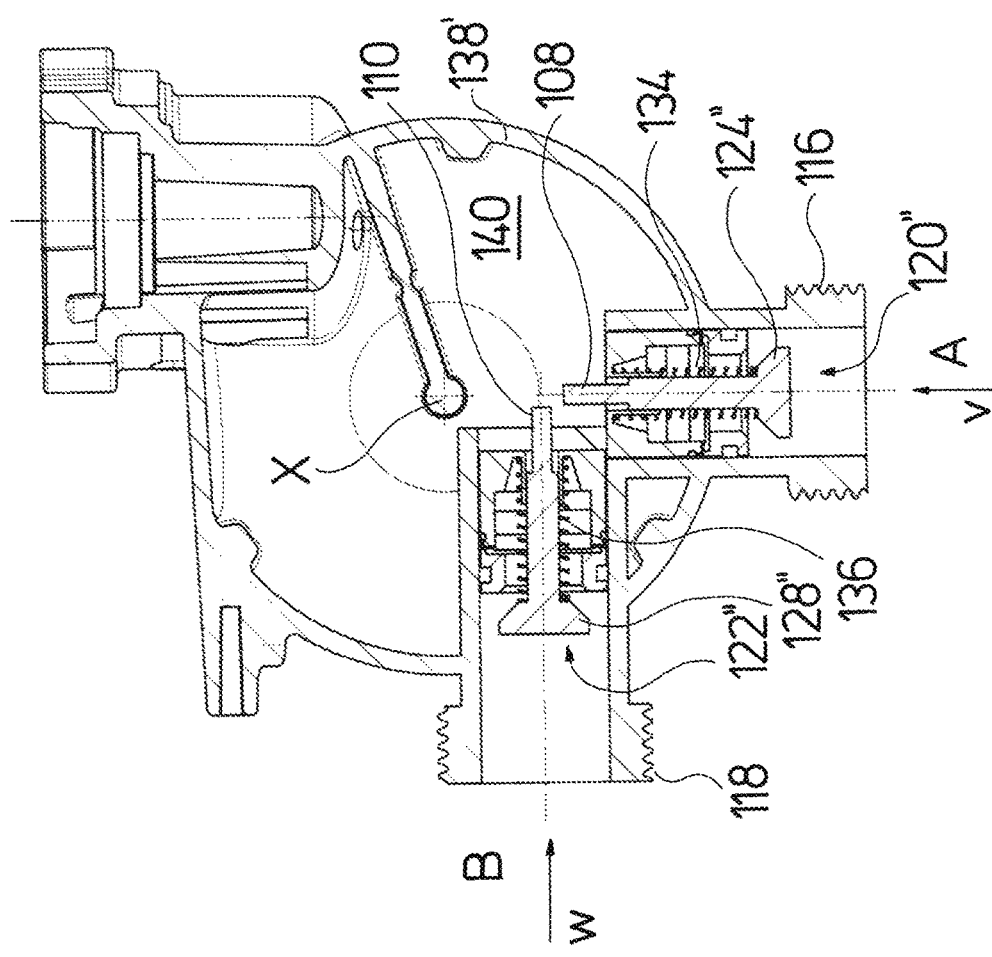
FIG. 19 is a sectioned view of a design, as an alternative to that of FIG. 14.

In the previous embodiment examples, the valves 86, 88, 120, 120' and 122 are designed such that they are closed in their first switch position forming the idle position, and are moved in a targeted manner into an opened second switch position by way of the occurring hydraulic forces. However, it is to be understood that the valves can also be designed in the reverse manner and be opened in their first switch position forming the idle position. The valves can then be moved in a targeted manner into a second closed switch position by the occurring hydraulic forces which are created by the circulation pump assembly. Such an embodiment example is shown in FIG. 19, which represents an alternative embodiment to the embodiment shown in FIG. 14. With the embodiment according to FIG. 19, valves 120" and 122" with valve elements 124" and 128" are shown, instead of the valves 120 and 122, and these elements are held in their first switch position which in this case is an opened switch position, in each case by way of compression springs 134 and 136, in the described manner. The valve elements 122" and 124", according to the previously description, can be brought in a targeted manner into a second switch position, in which they are closed, by way of a suitable activation of the circulation pump assembly 2, on account of the different biasing forces and different dynamic characteristics. Thereby, the pin-like extensions 108 and 110 as previously described effect a mutual blocking of the valves 120" and 122". The functioning manner of the valves 120" and 122" thereby corresponds to the previously described manner of functioning of the valves 120 and 122. The single difference lies in the fact that the valve elements 124" and 128" in the example shown in FIG. 19 are moved from an opened into a closed position instead of from a closed into an opened position.

Figure 16:
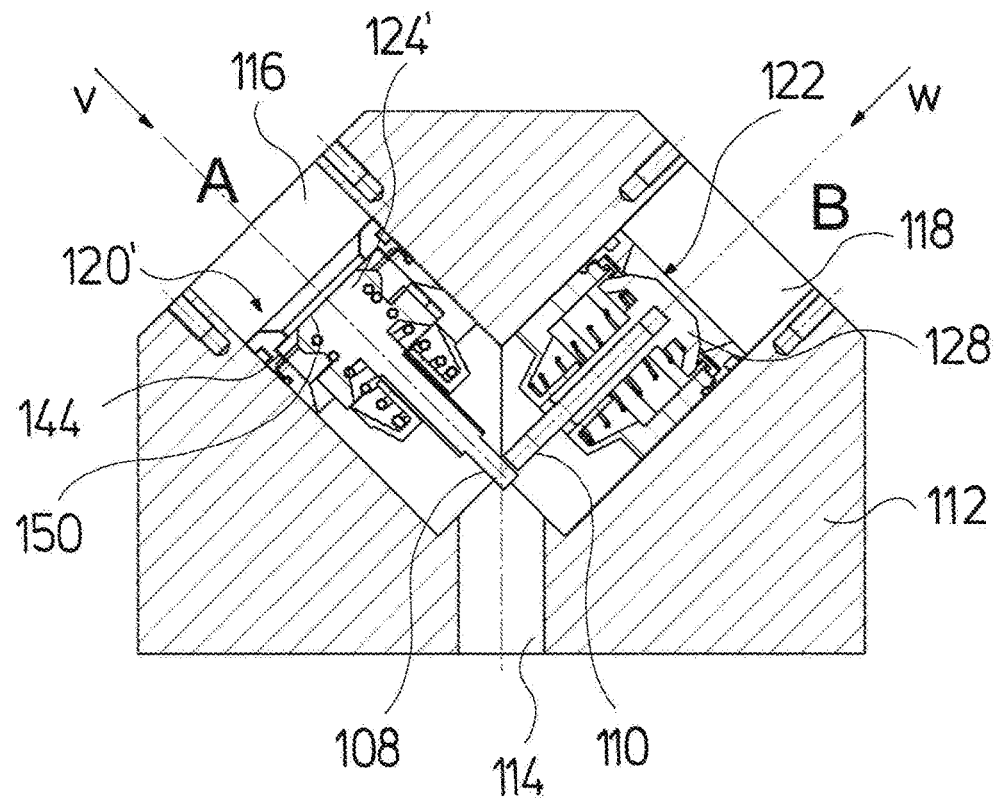
FIG. 16 is a sectioned view of a valve block with the valve according to FIG. 15, in a first switch position.
Figure 17:
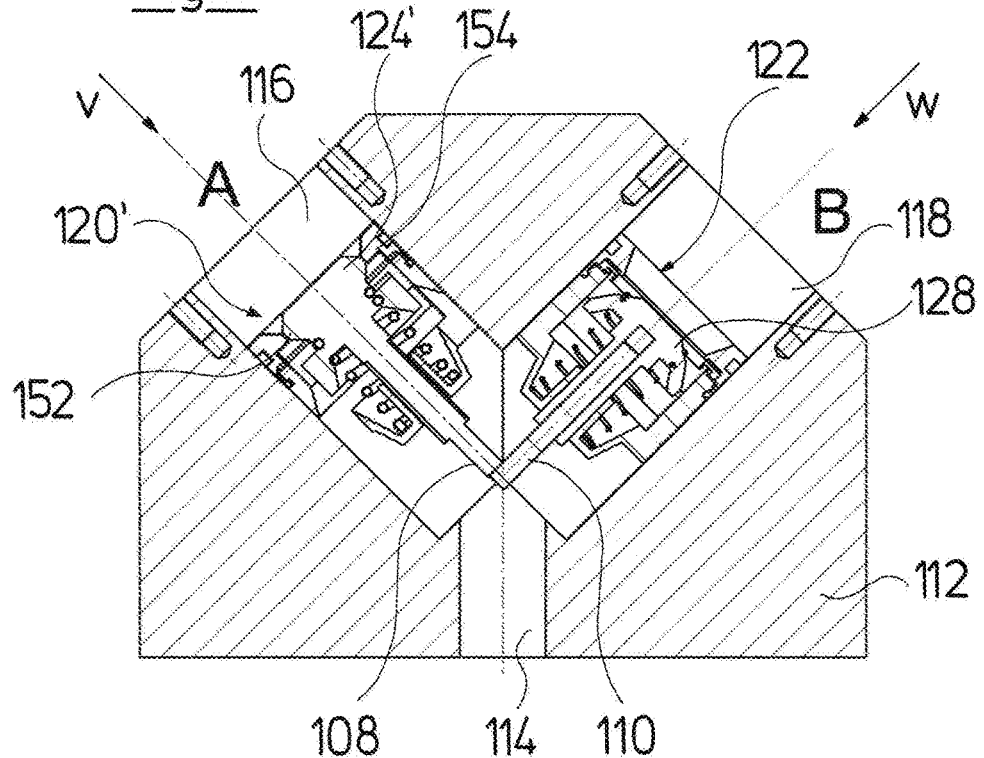
FIG. 17 is a sectioned view of the valve block according to FIG. 16, in a second switch position.

FIGS. 16 and 17 show an alternative arrangement of two valves corresponding to the valves 120 and 122 as have been described by way of FIGS. 9-14. The valve 122 which releases or closes the flow path to the second hydraulic circuit B thereby corresponds to that of the preceding description. The valve 120' which releases or closes the flow path to the first hydraulic circuit A, with regard to its damping function or delay function is designed differently than in the embodiment examples according to FIGS. 9-14.

Figure 15:
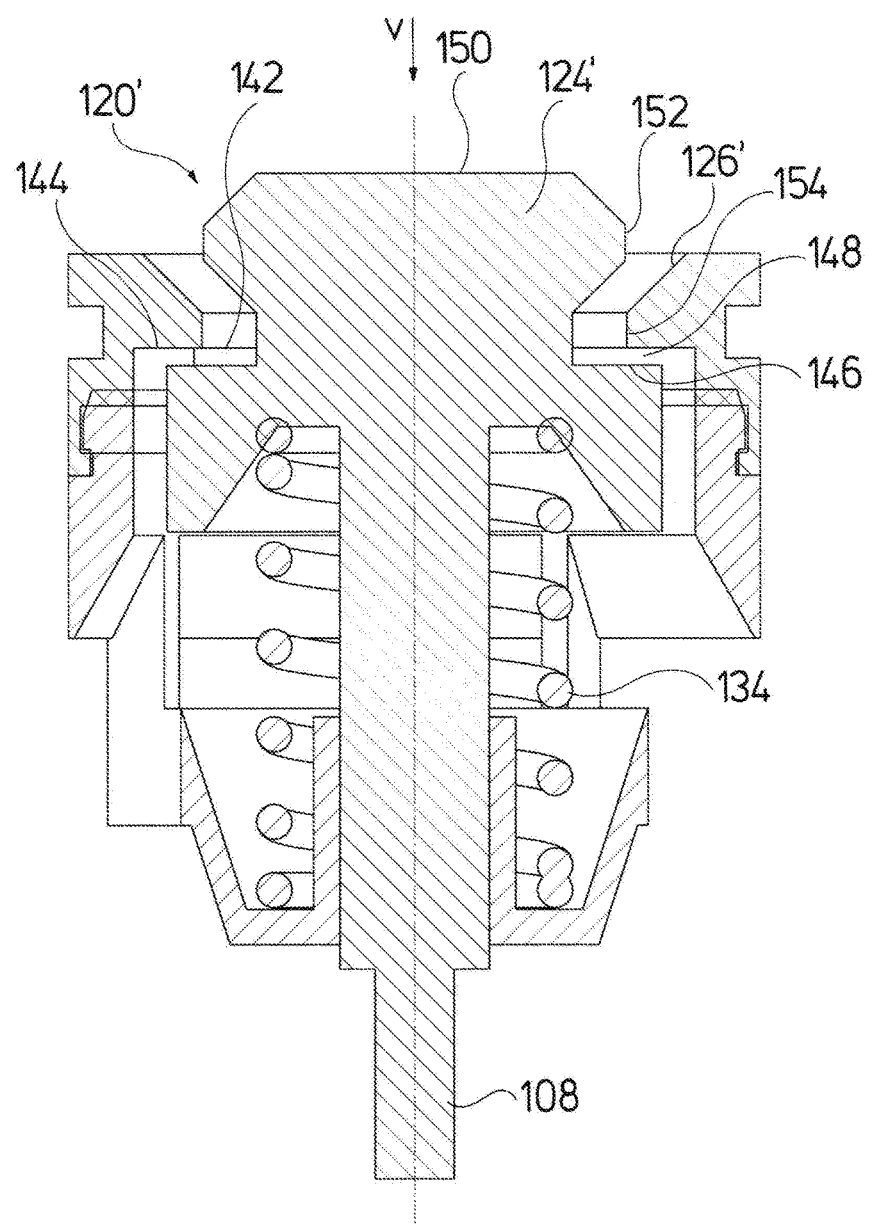
FIG. 15 is a sectioned view of a valve with a delay device.

The construction of the valve 120' is shown in an enlarged manner in a sectioned view in FIG. 15. The valve 120' differs from the valve 120 in the construction of the valve element 124' and of the valve seat 126'. FIG. 15 shows the closed switch position of the valve 120'. In this switch position, the valve element 124' bears via a projection 142 on an inner side of the valve seat 126'. The inner side 144 is away from the inlet 116. The projection 142 is situated on a radially outwardly projecting shoulder 146 of the valve element 124'. The projection 142 has the effect that the valve 120' is not completely closed in this first position, but rather a radially outwardly directed annular gap 148 is formed between the shoulder 146 and the inner side 144 of the valve seat 126'. A radially outwardly directed flow is effected through this annular gap 148, and this flow according to Bernoulli's law effects a force opposite to the opening direction v, onto the valve element 124' at the shoulder 46. This force is thus directed in the same direction as the spring force of the compression spring 134. The fluid pressure acts upon the face side 150 of the valve element 124', wherein the face side 150 represents a control surface. The hydraulic force which acts upon the control surface 150 is greater than the force of the compression spring 134 and the axial force arising in the annular gap 148 if the fluid pressure is large enough, so that the valve element 124' is moved in the opening direction. Thereby, the gap width of the annular gap 148 enlarges so that the hydraulic force which is on the shoulder 146 and which is directed oppositely to the opening force is reduced.

An annular surface 152 on the outer periphery of the valve element 124' close to its face side 150 moves into the region of the inner periphery 154 of the valve seat 126' during the continued movement of the valve element 124' in the opening direction v. The annular surface 152 has a diameter which is the same or slightly smaller than the inner diameter of the inner periphery 154. The valve 120' is essentially closed when the annular surface 152 lies opposite the inner periphery 154 of the valve seat 126'. This closed position is shown in FIG. 17. The valve 122 in this position is already opened due to the rapid pressure rebuild-up, as described above, and then via its pin-like extension 110 blocks a further opening of the valve 120' as described above. This is the first switch position of the switch device. The valve element 124' moves further in the opening direction v if the continued movement is not blocked by the pin-like extension 110 of the valve element 128, wherein the annular surface 152 passes the inner periphery 154 of the valve seat 126', so that a gap is formed between the inner side 144 and the face side 150 of the valve element 124', as is shown in FIG. 16, and thus the valve 120' is in its opened second position. As described above, in this position, the pin-like extension 108 of the valve element 124' blocks the valve element 128 in its movement, so that this cannot move into its opened position. Via the valve 120', the first hydraulic circuit A is then opened in this second switch position, whereas the second hydraulic circuit B is closed.

Figure 20:
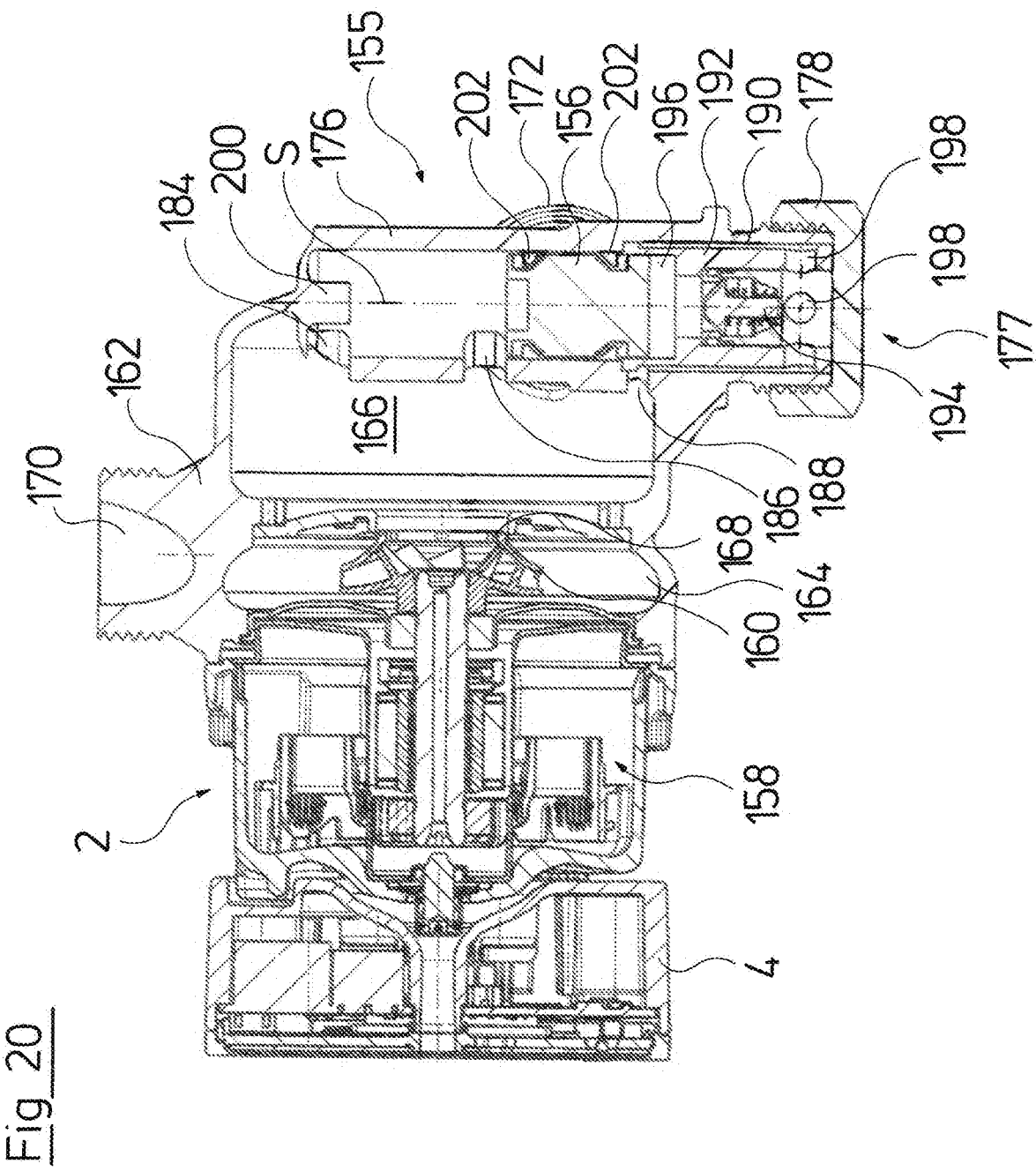
FIG. 20 is a sectioned view of a sectioned view of a circulation pump assembly with an integrated, hydraulically actuated switch device.

An alternative to the switch device 28 described by way of FIGS. 2-5 is described by way of FIGS. 20-24. With the switch device 155 shown in FIGS. 20-24, it is also the case of a switch-over valve for switching the flow path between two hydraulic circuits. With the embodiment according to FIGS. 20-24 only one valve element 156 is likewise provided, corresponding to the design according to FIGS. 2 to 5. The switch device 155 which is shown in FIGS. 20-24 integrates the circulation pump assembly 2 shown in FIG. 1 and the node point or branching point 14 shown in FIG. 1 into a construction unit. This means that the combination of the circulation pump assembly 2 and the switch device 155 which is shown in FIG. 20 is envisaged for installation at the branching point 14 of the hydraulic system which is shown in FIG. 1.

The circulation pump assembly 2 shown in FIG. 20 consists of an electric motor 158 which is arranged in a stator housing and drives an impeller 160. The impeller 160 is situated in a pump casing 162 which is connected to the stator housing, in which the drive motor 158 is located. The electronics housing 4 which accommodates the regulation and control electronics for the drive motor 158, in particular a frequency converter for speed setting, as is described by way of FIG. 1, is arranged at the axial side of the drive motor 158 which is away from the pump casing 162. Moreover, as described by way of FIG. 1, the electronics housing 4 can simultaneously also contain the control device 26 which controls the switch-over function by way of speed adaptation of the drive motor 158, in the subsequently described manner.

As with the embodiment according to FIG. 19, the switch device or the switch-over valve 155 with this embodiment example is integrated directly into the pump casing 162. The pump casing 162 in its inside comprises a pressure chamber 164, in which the impeller 160 rotates. A suction chamber 166 is moreover formed in the pump casing 162, into which the suction-side connections of the circulation pump assembly 2 run out and which is in connection with the suction port 168 of the impeller 160. The pump casing 162 comprises three connections, a pressure-side connection 170 which is in connection with the pressure chamber 164, as well as two suction connections 172 and 174. The suction-side connection 172 serves for the connection to the first hydraulic circuit A, and the suction-side connection 174 serves for the connection to the second hydraulic circuit B, as is shown in FIG. 1. The suction-side connections 172 and 174 run out into the switch-over or switch device 155. The switch device 155 creates the connection from the suction connections 172 and 174 to the suction chamber 166, wherein the connection 172 or the connection 174 can be selectively brought into connection with the suction chamber 166, by way of displacing the valve element 156 in the switch device 155. The flow can therefore be switched over between the first hydraulic circuit A and the second hydraulic circuit B.

The switch device 155 comprises a guide tube 176 which extends along the longitudinal axis S and in which the valve element 156 having a cylindrical basic shape is movably guided in the direction of the longitudinal axis S. The guide tube 176 is designed in an open manner at a first axial end 177 and is closed by the closure element in the form of a screw cap 178. The opening which is closed by the closure element 178 serves as an assembly opening. The suction-side connection 172 ends at an opening 180 in the peripheral wall of the guide tube 176. The suction-side connection 174 ends in an opening 182 which is likewise situated in the peripheral wall of the guide tube 176. Thereby, the openings 180 and 182 are distanced to one another in the axial direction in the direction of the longitudinal axis S of the guide tube 146. The valve body 156, in its first axial end position shown in FIG. 23 covers the opening 180, whereas in its second axial end position which is shown in FIG. 24, it covers the opening 182 and releases the opening 180. Thus the openings 180 and 182 can be alternately opened by way of displacing the valve body 156, so that the connections 172 and 174 can be alternately brought into fluid-leading connection with the inside of the guide tube 176.

The guide tube 176 moreover comprises three openings 184, 186 and 188, which are likewise axially distanced to one another in the direction of the longitudinal axis S and connect the inside of the guide tube 176 to the suction chamber 166. The openings 184 and 186 are connected directly to the inside of the guide tube 176. The lower opening 188 in contrast runs out into an annular space 190 which in the inside of the guide tube 176, is formed by an inserted sleeve 192. The sleeve 192 is inserted into the guide tube 176 from the open first axial end and has an outer circumference which is smaller than the inner circumference of the guide tube 176 at this first axial end, so that the annular space 190 is formed between the inner periphery of the guide tube 176 and the outer periphery of the sleeve 192. The sleeve 192 simultaneously serves as a valve carrier and accommodates a spring-biased check valve 194. The check valve 194 thus bears on the first axial end of the guide tube 176. A pressure space 196 is formed between the check valve 194 and the valve element 156. The check valve 194 is arranged such that it closes against the pressure in the pressure space 196, which means that it can be opened by the pressure in the pressure space 196 against the spring bias. Openings 198 to the annular space 190 are formed in the sleeve 192, on the side of the check valve 194 which are away from the pressure chamber 156. This means that this side of the check valve 194 which is away from the valve element 156 is connected to the suction chamber 166.

An abutment 200 is arranged at the second axial end of the guide tube 176 which is away from the open end, in the inside of this guide tube. The abutment 200 is situated such that the opening 184 to the inside of the guide tube 176 at the axial end of this guide tube remains open when the valve elements 156 abuts onto the abutment 200 in its second end position shown in FIG. 24. Thus the axial side of the valve element 156 which faces the abutment 200 is always in pressure-transmitting connection with the suction chamber 166.

The valve element 156 is led with play in the inside of the guide tube 176. The valve element 156 for sealing comprises two seals 202 which have a v-shaped profile and which are in two axially distanced, annular grooves. The seals 202 are designed such that they do not unfold until at a certain predefined pressure, in the region which is situated between the outer periphery of the valve element 156 and the opposite inner wall of the guide tube 26 between the two seals 202, and sealingly bear on the inner wall of the guide tube 176. This means that the seals 202 only come into sealing contact when an adequately high pressure acts between them, as can be the case for example if one of the openings 180 and 182 lies between the seals 202. The seals 202 thus act such that given a movement of the valve element 156, they do not sealing bear on the guide tube 176, but only come into sealing contact with the guide tube 176 in the described end positions of the valve element 156.

Figure 23:
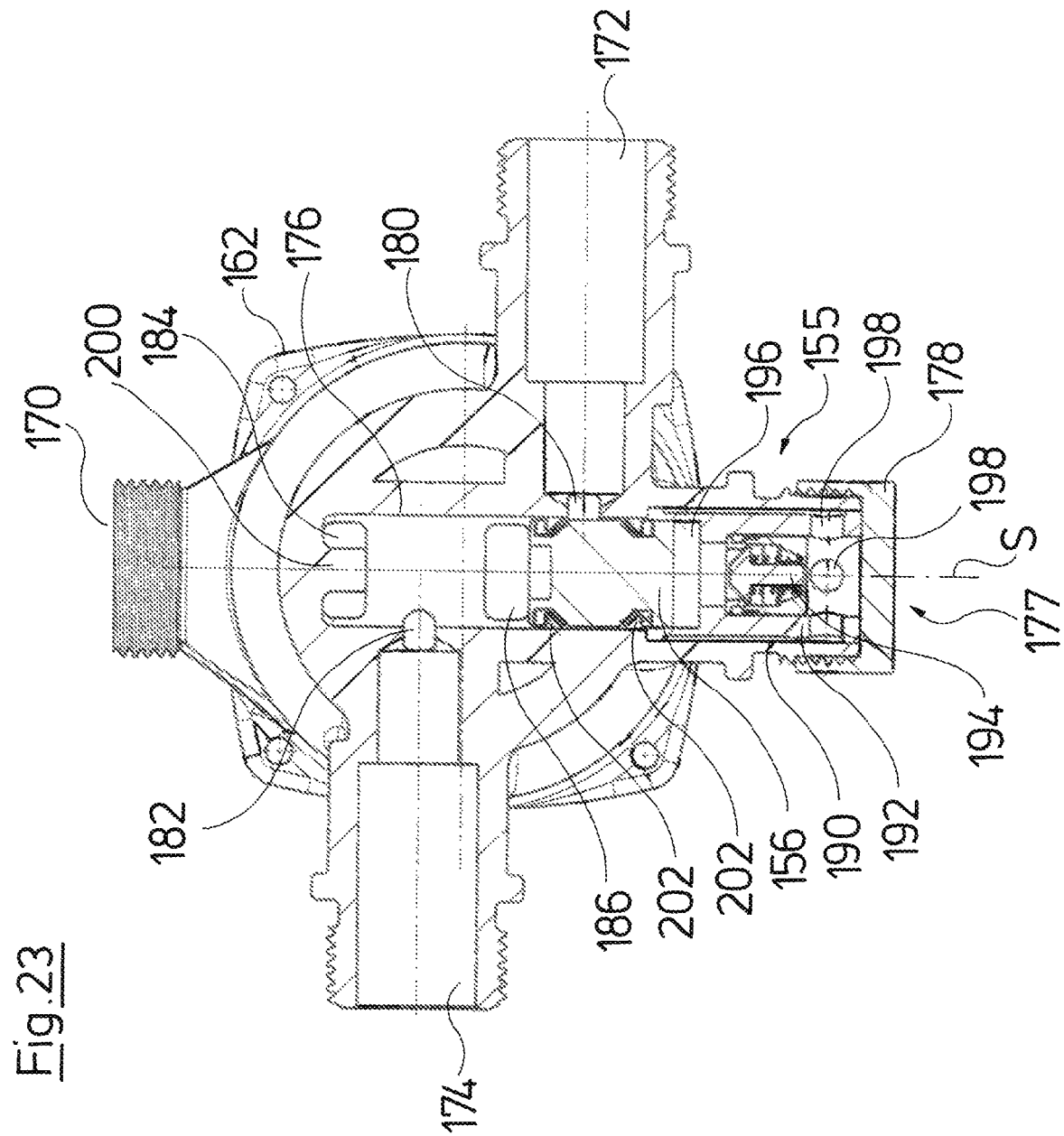
FIG. 23 is a sectioned view of the switch device according to FIG. 20, in a first switch position.
Figure 24:
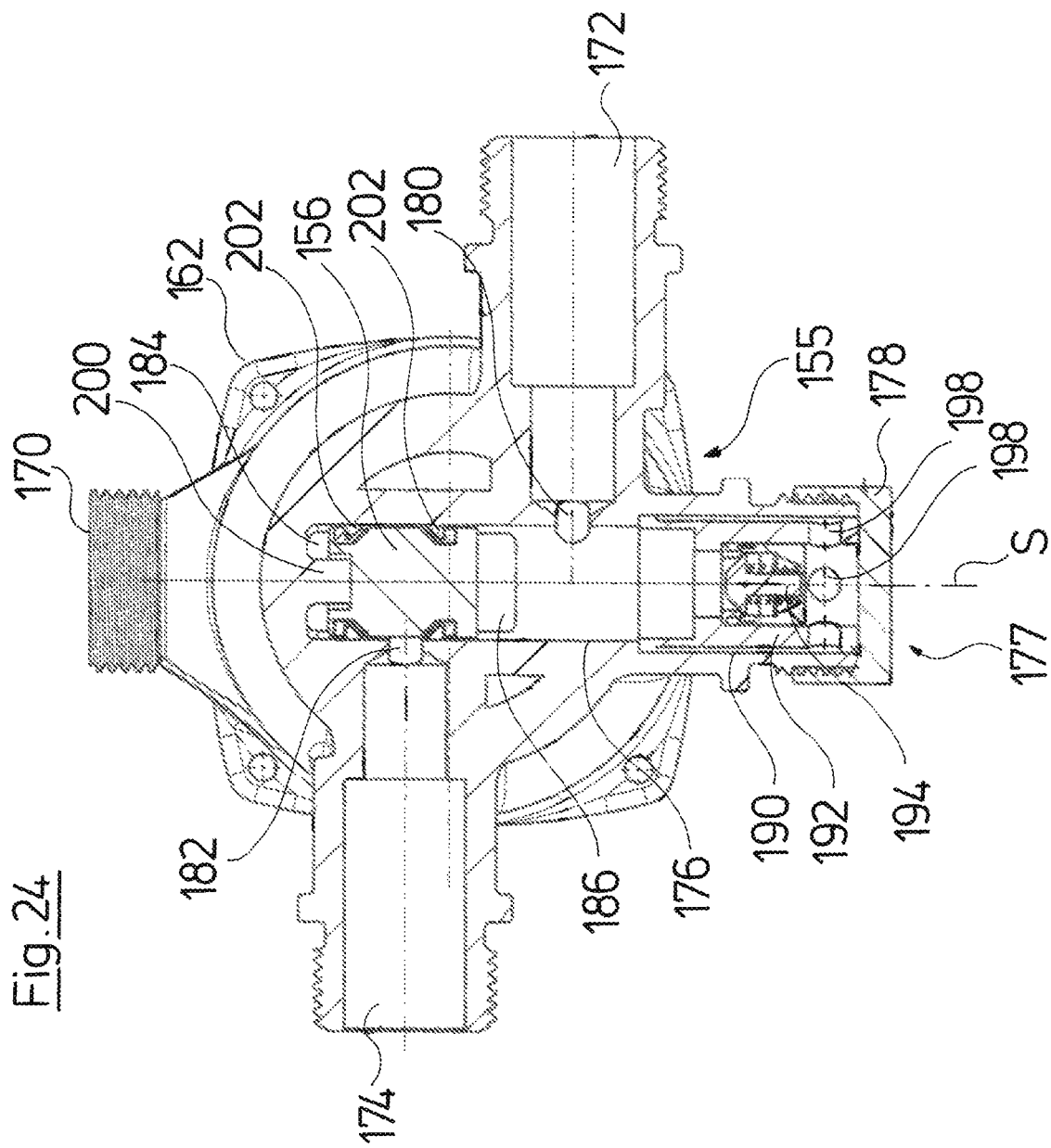
FIG. 24 is a sectioned view according to FIG. 23, with which the switch device is located in a second switch position.

For operation, the pump casing 162 with the switch device 155 is to be aligned in the installation position which is shown in FIGS. 20-24, so that the longitudinal axis S of the guide tube is directed vertically. This has the effect that the valve element 156 in the pressure-less condition falls into the first, lower end position shown in FIG. 23, by way of the gravity. Departing from this end position, the pump assembly 2 can be actuated by way of a suitable activation of the drive motor 158 via the control device 26 such that the valve element 156 selectively remains in the first end position which is shown in FIG. 23 and in which the hydraulic circuit A through the radiators 10 is closed and the second hydraulic circuit B through the secondary heat exchanger 8 is opened, or into its second end position which is shown in FIG. 24 and in which the first hydraulic circuit A is opened and the second hydraulic circuit B is closed. This is effected as follows:

If the pump assembly is started with a slow speed or a slow speed increase or acceleration, then a pressure builds up across the branching point 12 in the closed first hydraulic circuit A. This pressure propagates through a gap in the form of a leakage flow between the valve body 156 and the inner wall of the guide tube 176, into the pressure space 196, on account of the play of the valve element 156 in the guide tube 176. The pressure in the suction chamber 166 simultaneously prevails at the opposite axial end side of the valve element 156, since this is in connection with the interior of the guide tube 176 via the openings 182 and 186. This pressure is lower than the pressure building up in the first hydraulic circuit A, so that the valve element 156 is moved upwards into its second end position which is shown in FIG. 24, by way of the leakage flow which flows through the connection 172, the gap between the valve element 156 and the guide tube 176, into the pressure space 196. The opening 182 is now closed by the valve element 156 in this second end position, whereas the opening 180 to the connection 172 is opened. Moreover, the valve element 156 then releases the opening 186 to the suction chamber 166, so that a direct connection of the connection 172 to the suction space 166 is created. The opening 184 to the suction space 166 simultaneously remains open, so that a suction continues to acts at the upper axial end of the valve element 156. Simultaneously, the valve element 156 is impinged radially with pressure via the connection 174, by way of the pressure which now builds up in the second hydraulic circuit B, and thus presses against the inner wall of the guide tube 176. The seals 202 also fold apart due to this pressure and lead to a sealing of the gap between the valve element 156 and the inner wall of the guide tube 176. Thus the valve element 156 then remains in the switch position which is shown in FIG. 24, specifically the upper switch position, in which the first hydraulic circuit A forming a heating circuit in the example in FIG. 1 is opened. If the pump assembly 2 is switched off, then the system becomes pressure-less and the valve element 156 falls back into its first end position which is shown in FIG. 23, on account of gravity.

If the pump assembly 2 is now started at a high speed or a rapid speed increase, then firstly a suction or vacuum arises in the suction chamber 166 due to the hydraulic resistance in the opened hydraulic circuit B, and the spring biasing of the check valve 194 is selected such that the check valve 194 opens against its spring biasing on account of this suction. The spring biasing however is selected such that with the previously described slow starting-up of the pump assembly, the thus arising suction is not sufficient to open the check valve 194. The opening of the check valve 194 leads to no further pressure which would displace the valve element 156 further upwards being able to be built up in the pressure space 196, and the valve element 156 essentially remains in its first switch position or end position shown in FIG. 23, so that the second hydraulic circuit B through the secondary heat exchanger 8 for service water heating remains open. The pressure prevailing at the connection 172 however continues to be sufficient to bring the seals 202 to unfold, such that they seal the valve element 156 against the inner wall of the guide tube 176, so that the leakage flow through connection 172 in the pressure space 196 is essentially interrupted. No pressure build-up takes place in the pressure space 196, and the valve element 156 also does not displace into the end position shown in FIG. 24 even with a further speed change or speed increase.

Thus two stable switch positions are created, which each are self-holding as long as the pump assembly 2 is in operation. The valve element 156 can be moved into one of two possible switch positions depending on the speed course, with which the pump assembly 2 is started up from the idle position, and thus a switching between the hydraulic circuits A and B can be achieved.

Figure 25:
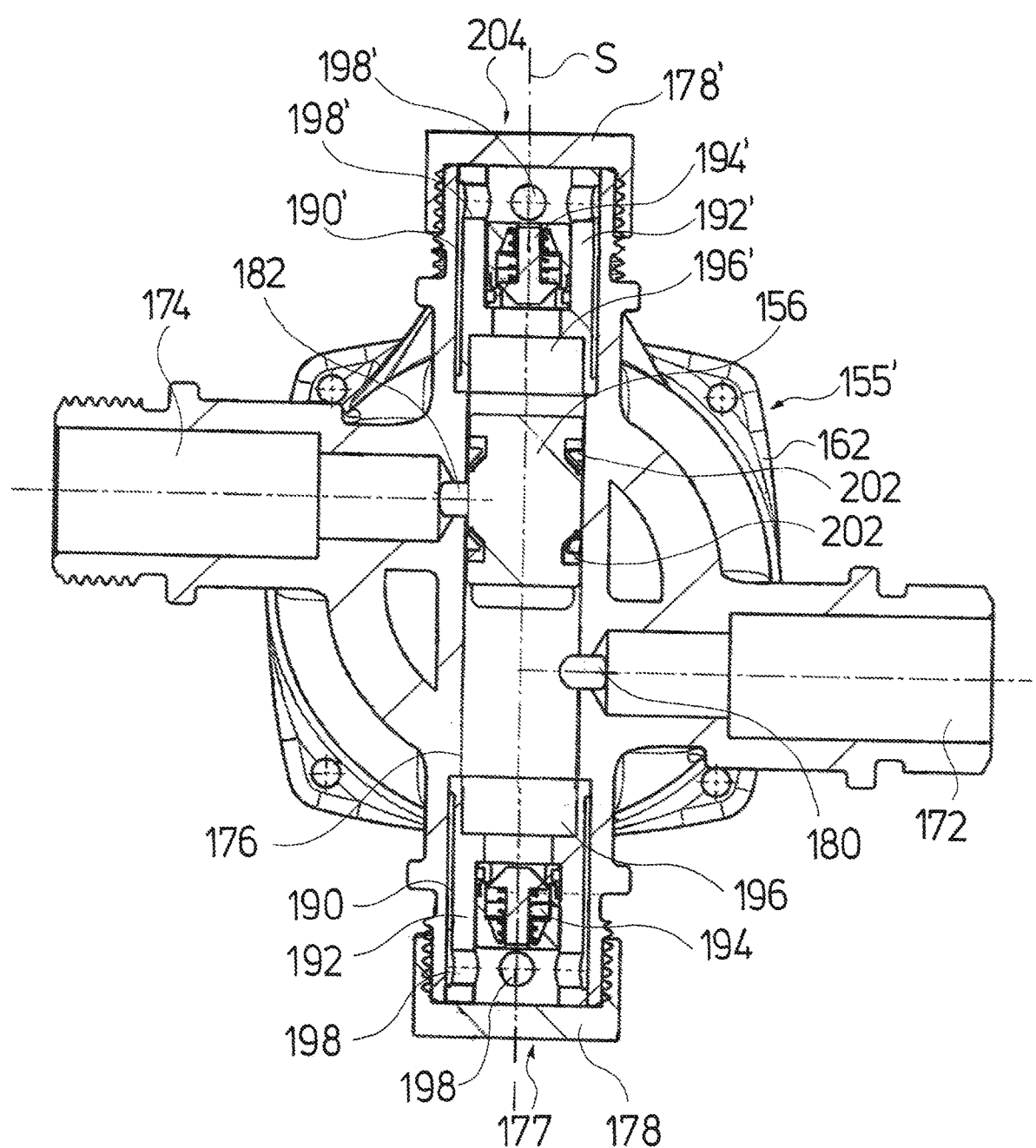
FIG. 25 is a sectioned view of a variant of a switch device described by way of FIGS. 20-24.

The embodiment which is described by way of FIGS. 20-24 demands an alignment of the axis S in the vertical direction, so that the valve element 156 can fall back into its first end position by way of gravity, or the arrangement of a restoring element such as a spring. Alternatively, a hydraulic drive for restoring the valve element can be provided. FIG. 25 now shows a variant, with which the valve element 156 can be moved back into its first end position in a pressure-controlled manner, so that no vertical alignment of the axis S is necessary. The switch device 155' corresponds essentially to parts of the switch device 155 which have been described by way of FIGS. 20-24. In particular, the first axial end 177 of the guide tube 176 is designed identically to the check valve 194 which is arranged there. The difference of the design according to FIG. 25 to the previously described embodiment lies in the design of the second axial end 204 of the guide tube 176. With the embodiment example according to FIG. 25, this second axial end 204 is designed mirror-symmetrically to the first axial end 177. This means that this axial end is also designed in an open manner and is closed by a closure element 178'. A sleeve 192' with a check valve 194' which is arranged therein is arranged in the inside of the guide tube 176, at this end. An annular space 190' is formed surrounding the sleeve 192' and is connected via an opening which is not shown here, to the suction chamber 166 of the circulation pump assembly 2. The suction chamber 166 and the remaining part of the circulation pump assembly 2 are designed exactly as is described by way of FIGS. 20-24. The sleeve 192' is designed such that a pressure space 196' remains when this valve element 156 is located in its second end position which is adjacent the sleeve 192'. The check valve 194' is arranged such that it closes towards the pressure space 196', which means can be opened against the spring bias by way of an adequately high pressure in the pressure space 196'. The inside of the sleeve 192' at the side of the check valve 194' which is away from the pressure space 196' and the valve element 156 is connected by openings 198' to the annular space 190' and via these to the suction chamber 166.

The valve element 156, with the embodiment according to FIG. 25 can also be moved into its second, end position shown in FIG. 25, in the same manner as has been described by way of FIGS. 20-24. Alternatively, the valve element 156 can remain in its first end position or switch position which corresponds to the end position shown in FIG. 23, by way of a slow start-up of the circulation pump assembly 2. In contrast to the embodiment example according to FIGS. 20 and 24, with the embodiment according to FIG. 25, it is possible to move the valve element 156 back into its first end position not by way of gravity but hydraulically. For this, on operation of the circulation pump assembly 2, its speed is lowered by the control device 26 to such an extent that the pressure in the connection 174, said pressure being transmitted via the closed second hydraulic circuit B, drops to such an extent that the seals 202 relax and release from the sealing contact on the guide tube 176. The suction at the suction side of the circulation pump assembly simultaneously reduces, so that the check valves 194 and 194' close. Thus a leakage flow from the connection 124 into the pressure space 196' is rendered possible and this leakage flow then leads to the valve element 156 being moved back in the direction of the first axial end 177. The speed of the circulation pump assembly 2 can be increased again after a certain time, in such a manner that such a suction is produced in the suction camber 166, that the check valves 194 and 194' open again, which permits a movement of the valve element 156 up to its first end position on the sleeve 192.

The check valve 194' serves for effecting the movement of the valve element 156 into the second end position shown in FIG. 25. If the circulation pump assembly is started at a high speed or a high acceleration, then such a vacuum arises in the suction chamber 166 that not only the check valve 194 but also the check valve 194' opens. Thus the opened check valve 194' then has the same function as the opening 184 in the embodiment according to FIGS. 20-24. Thus the section-side pressure of the suction chamber 166 acts in the pressure space 196' with the movement of the valve element 156 into the switch position at the second axial end 204.

The embodiment according to FIG. 25 thus permits the valve element 156 to be moved to and fro in a targeted manner between its two end positions, independently of the gravitation force, wherein the movement is effected in a targeted manner by way of a suitable activation of the drive motor 158. The necessary speed courses are set via the drive motor 158, in order to be able to move the valve element 156 in the described manner. In particular, in the case of a blocking of the valve element 156 it is also possible to impinge this with pressure alternately from both sides, in order to release the blocking. Moreover, it is helpful with this embodiment if the position of the valve element 156 is known to the control device 26. A circulation pump assembly 2 which is designed with a corresponding sensor means is in the position of determining the flow rate from detected hydraulic variables and/or electric variables. It is possible for the control device 26 to recognize which of the hydraulic circuits A and B is presently open, from hydraulic variables, in particular from detected or determined flows, since it is particularly the hydraulic characteristics of a secondary heat exchanger 8 which are known and are not changing. The switch position of the valve element 156 can be recognized from this. The drive motor then, assuming the recognized switch position of the valve element 156, can be activated in its speed such that the valve element 156 is moved into the desired switch position, as has been described above. The hydraulic system according to this embodiment thus preferably comprises a control device 26 which is designed for this and a correspondingly designed circulation pump assembly 2, which is in the position of detecting the necessary hydraulic variables.

While specific embodiments of the invention have been shown and described in detail to illustrate the application of the principles of the invention, it will be understood that the invention may be embodied otherwise without departing from such principles.

The invention claimed is:

1. A hydraulic system comprising:
at least one circulation pump assembly provided with a speed controller;
at least one hydraulic circuit connected to the circulation pump assembly;
at least one mechanical switch device which is subjected to pressure from a fluid in the hydraulic circuit and which can be moved into at least two different switch positions, wherein the at least one mechanical switch device can be moved by the circulation pump assembly by way of a hydraulic coupling via the fluid, and the speed controller is configured to initiate a movement of the switch device by way of at least one hydraulic force acting upon the switch device and causing a movement of the switch device which is produced via the hydraulic circuit via a speed adaptation of the circulation pump assembly, wherein the mechanical switch device is configured to react to differences in a course of a pressure build-up of the fluid given a speed change of the circulation pump assembly, such that the switch device moves into a first switch position given a speed change of the circulation pump assembly with a first course of the pressure build-up, and into a second switch position given a speed change of the circulation pump assembly with a second course of the pressure build-up which is different to the first course.

2. A hydraulic system according to claim 1, wherein the mechanical switch device is configured to react to pressure changes due to the speed change of the circulation pump assembly, such that the mechanical switch device can be selectively moved into one of the switch positions in dependence on the pressure or a change of the pressure, wherein the mechanical switch device comprises a first movable valve element and a second movable valve element, the first movable valve element being arranged in a first of the hydraulic circuits and the second movable valve element being arranged in a second of the hydraulic circuits, the first movable valve element being connected to a first spring, the second movable valve element being connected to a second spring, the first spring comprising a first spring compression rate, the second spring comprising a second spring compression rate, the first spring compression rate being different from the second spring compression rate.

3. A hydraulic system according to claim 1, wherein the mechanical switch device is configured in self-holding manner, to remain in an assumed switch position up to a predefined speed or speed change of the circulation pump assembly.

4. A hydraulic system according to claim 1, wherein the speed controller is configured such that at least two different speed courses of the circulation pump assembly can be set by the speed controller, wherein the speed controller is configured such that the circulation pump assembly permits speed changes with at least two different acceleration courses.

5. A hydraulic system according to claim 1, wherein the switch device is configured such that movements into the at least two different switch positions are effected with different temporal delays, wherein the movements are effected along differently long paths and/or counter to differently large damping, inertia forces and/or biasing forces.

6. A hydraulic system according to claim 1, further comprising at least another hydraulic circuit to provide at least two hydraulic circuits wherein the circulation pump assembly is connected to the at least two hydraulic circuits, and the mechanical switch device is subjected to fluid pressure via at least one of the hydraulic circuits, such that the switch device is movable by way of the forces produced by the fluid pressure.

7. A hydraulic system according to claim 1, further comprising at least another hydraulic circuit to provide at least two hydraulic circuits wherein the circulation pump assembly is connected to the at least two hydraulic circuits and the at least one mechanical switch device is configured as at least one valve with at least one movable valve element for a change of a ratio of flows through the at least two hydraulic circuits and for switching-over a flow path between the at least two hydraulic circuits.

8. A hydraulic system according to claim 6, wherein the switch device comprises at least one first control surface, upon which a fluid pressure in a first of the hydraulic circuits, a fluid pressure at the exit of the first hydraulic circuit acts, and at least one second control surface, upon which a fluid pressure in a second of the hydraulic circuits or at the delivery side of the circulation pump assembly acts.

9. A hydraulic system according to claim 8, wherein the control surfaces are connected to the at least one valve element such that a fluid pressure acting upon the control surfaces effects at least one force which acts upon the valve element and which is directed at least partly in the direction of a movement axis of the valve element.

10. A hydraulic system according to claim 8, wherein the first control surface is larger than the second control surface.

11. A hydraulic system according to claim 8, wherein the first and the second control surface are arranged such that the forces which are produced by the fluid pressure on the first and the second control surface at least partly are directed counter to one another.

12. A hydraulic system according to claim 8, wherein the first and the second control surface, in the hydraulic system are placed and dimensioned such that given a speed change of the circulation pump assembly, a pressure build-up on the first control surface is effected more slowly than on the second control surface, wherein with a first more rapid speed change, the more rapid pressure increase at the second control surface effects a movement of the switch device, whereas with a second relatively slower speed change, a pressure build-up on the first and second control surface is effected so slowly that a force equilibrium of the forces acting upon the control surfaces is maintained.

13. A hydraulic system according to claim 1, wherein the switch device is additionally subjected to gravity force, to a magnet force and/or spring force, and these forces act in the direction of a movement axis of the switch device.

14. A hydraulic system according to claim 8, wherein the switch device is additionally subjected to gravity force, to a magnet force and/or spring force, and these forces act in the direction of a movement axis of the switch device and the gravity force, magnet force and/or spring force are directed at least partly counter to a force acting upon the second control surface by the fluid pressure.

15. A hydraulic system according to claim 8, wherein the at least one valve elements is configured as a movable hollow cylinder, wherein a first axial end of the hollow cylinder forms an entry opening which can be connected to the second hydraulic circuit, and the hollow cylinder in a peripheral wall comprises at least one second entry opening which is connectable to the first hydraulic circuit, and a second axial end of the hollow cylinder forms an exit opening which is connected to an entry of the circulation pump assembly.

16. A hydraulic system according to claim 15, wherein the second axial end of the hollow cylinder is in connection with a suction port of an impeller of the circulation pump assembly.

17. A hydraulic system according to claim 8, where the at least one valve element is configured as a movable hollow cylinder, with a first axial end forming an entry opening which can be connected to the second hydraulic circuit and a peripheral wall comprising at least one second entry opening which is connectable to the first hydraulic circuit, and a second axial end forming an exit opening which is connected to an entry of the circulation pump assembly and the first and the second control surface are connected to the hollow cylinder in a force-transmitting manner, wherein the first and/or the second control surface are formed on the hollow cylinder and are formed by an axial end-face of the hollow cylinder.

18. A hydraulic system according to claim 17, wherein the second control surface is formed by at least one surface element which is situated in the pressure region of the circulation pump assembly and is distanced to an impeller of the circulation pump assembly.

19. A hydraulic system according to claim 7, wherein the valve element of the mechanical switch device is configured as a movable slide with an axial face side, which is first in a movement direction, that forms a first control surface and with an axial face side, which is second in the movement direction, that forms a second control surface, and these are subjected to a fluid pressure from one of the hydraulic circuits, to a fluid pressure at the suction side of the circulation pump assembly or to a fluid pressure at the delivery side of the circulation pump assembly.

20. A hydraulic system according to claim 19, wherein the valve element in a first switch position closes the first hydraulic circuit and in a second switch position closes the second hydraulic circuit, wherein the valve element closes the hydraulic circuits with a surface which extends parallel to the movement direction and which is delimited by at least one seal, said at least one seal being movable such that said at least one seal comes into sealing contact depending on fluid pressure bearing on the surface.

21. A hydraulic system according to claim 19, wherein the first and/or the second control surface in each case faces a pressure space, at which a valve is situated, said valve being configured to control a pressure subjection of the pressure space to a fluid pressure from one of the hydraulic circuits, a suction side of the circulation pump assembly or a delivery side of the circulation pump assembly, wherein the valve opens in a pressure-dependent manner.

22. A hydraulic system according to claim 19, wherein the switch device is configured such that at least one of the two control surfaces is subjected to a fluid pressure of that hydraulic circuit which is currently at least partly closed by the valve element, for moving the valve element.

23. A hydraulic system according to claim 1, wherein the mechanical switch device comprises at least one first and a second movable valve element, of which the first valve element is arranged in a first of the hydraulic circuits and the second valve element in a second of the hydraulic circuits, wherein the first and the second valve element have different dynamic characteristics, with regard to movement, are differently greatly damped or configured to react in a delayed manner and/or have differently large biasing forces counter to the movement direction.

24. A hydraulic system according to claim 23, wherein the first and the second valve element are coupled such that always only one valve element can be in an opened switch position or always only one valve element can be in a closed switch position.

25. A hydraulic system according to claim 6, wherein the hydraulic system is configured as a hydraulic heating system and/or cooling system, wherein one of the at least two hydraulic circuits runs through a secondary heat exchanger for the temperature control of service water and one of the at least two hydraulic circuits runs through at least one object to be temperature controlled.

26. A hydraulic circulation system according to claim 1, wherein the circulation pump assembly and the at least one switch device are arranged in a common integrated hydraulic construction unit for a compact heating installation.

27. A method for the operation of a hydraulic circulation system with at least one hydraulic circuit, at least one circulation pump assembly and at least one mechanical switch device which is connected hydraulically to the circulation pump assembly and which can be moved into at least two switch positions, the method comprising the steps of:
effecting a movement of the switch device between a first and a second switch position by way of speed adaptation of the circulation pump assembly, by way of which at least one hydraulic force which acts upon the switch device and causes a movement of the switch device is produced, wherein the mechanical switch device is configured to react to differences in a course of a pressure build-up of fluid given a speed change of the at least one circulation pump assembly, such that the switch device moves into a first switch position given a speed change of the at least one circulation pump assembly with a first course of the pressure build-up, and into a second switch position given a speed change of the at least one circulation pump assembly with a second course of the pressure build-up which is different to the first course.

28. A method according to claim 27, wherein a movement of the switch device between the first and the second switch position is effected in dependence on a pressure produced by the circulation pump assembly and in particular on a course of a pressure build-up.

29. A method according to claim 27, wherein the mechanical switch device comprises a first movable valve element and a second movable valve element, the first movable valve element being arranged in a first of the hydraulic circuits and the second movable valve element being arranged in a second of the hydraulic circuits, the first movable valve element being connected to a first spring, the second movable valve element being connected to a second spring, the first spring comprising a first spring compression rate, the second spring comprising a second spring compression rate, the first spring compression rate being different from the second spring compression rate.

30. A hydraulic system comprising:
a circulation pump assembly comprising a speed controller, the speed controller comprising an impeller;
a hydraulic circuit connected to the circulation pump assembly;
a mechanical switch device which is subjected to pressure from a fluid in the hydraulic circuit, the mechanical switch device being configured to be movable into at least two different switch positions, wherein the mechanical switch device can be moved by the circulation pump assembly by a hydraulic coupling via the fluid, and the speed controller is configured to initiate a movement of the mechanical switch device by at least one hydraulic force acting upon the switch device and causing a movement of the mechanical switch device which is produced via the hydraulic circuit via a speed adaptation of the circulation pump assembly, wherein the mechanical switch device is configured to react to differences in a course of a pressure build-up of the fluid via a change in acceleration of the impeller such that the mechanical switch device is configured to move into a first switch position via a first course of the pressure build-up based on a first acceleration of the impeller and the mechanical switch device is configured to move into a second switch position via a second course of the pressure build-up based on a second acceleration of the impeller, the first course of the pressure build-up being different from the second course of the pressure build-up, the first acceleration of the impeller being different from the second acceleration of the impeller.

* * * * *